(12) United States Patent
Kim et al.

(10) Patent No.: US 10,597,043 B2
(45) Date of Patent: Mar. 24, 2020

(54) PARKING ASSISTANCE APPARATUS AND VEHICLE INCLUDING THE SAME

(71) Applicant: LG ELECTRONICS INC., Seoul (KR)

(72) Inventors: Cheolmun Kim, Seoul (KR); Sangmin Park, Seoul (KR); Nami Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 300 days.

(21) Appl. No.: 15/639,576

(22) Filed: Jun. 30, 2017

(65) Prior Publication Data

US 2018/0043905 A1 Feb. 15, 2018

(30) Foreign Application Priority Data

Aug. 12, 2016 (KR) .................. 10-2016-0103187

(51) Int. Cl.
*B60W 50/10* (2012.01)
*B60W 30/06* (2006.01)
(Continued)

(52) U.S. Cl.
CPC ............ *B60W 50/10* (2013.01); *B60W 10/18* (2013.01); *B60W 10/20* (2013.01); *B60W 30/06* (2013.01); *B60W 50/14* (2013.01); *B62D 15/0285* (2013.01); *B60W 2050/146* (2013.01); *B60W 2420/42* (2013.01); *B60W 2510/18* (2013.01); *B60W 2510/20* (2013.01); *B60W 2520/105* (2013.01); *B60W 2550/10* (2013.01); *B60W 2710/18* (2013.01); *B60W 2710/20* (2013.01); *B60W 2720/106* (2013.01)

(58) Field of Classification Search
CPC .............................. B60W 50/10; B60W 30/06
See application file for complete search history.

(56) References Cited

U.S. PATENT DOCUMENTS

| 10,077,073 | B2 * | 9/2018 | Allexi ................... B60W 50/10 |
| 2015/0100193 | A1 | 4/2015 | Inagaki et al. |
| 2018/0244287 | A1 * | 8/2018 | Kirstein ............... B62D 15/027 |

FOREIGN PATENT DOCUMENTS

| JP | 2007326415 | 12/2007 |
| JP | 04039062 A | 1/2008 |

(Continued)

*Primary Examiner* — Todd M Melton
(74) *Attorney, Agent, or Firm* — Fish & Richardson P.C.

(57) ABSTRACT

A parking assistance apparatus includes a sensor unit configured to sense vehicle surroundings; an interface unit configured to receive at least one of brake operation input information, accelerator operation input information, and steering operation input information; a display unit configured to display a graphic image for an automatic parking function; and a processor configured to set a target parking space based on information about the vehicle surroundings sensed by the sensor unit; design a parking path for directing a vehicle to the set target parking space; and perform the automatic parking function by performing control such that the vehicle follows the parking path, wherein, when it is detected that there is an operation input of the user through the interface unit, the processor performs the automatic parking function by reflecting the operation input of the user or releases the automatic parking function.

19 Claims, 27 Drawing Sheets

(51) Int. Cl.
*B60W 50/14* (2020.01)
*B60W 10/20* (2006.01)
*B60W 10/18* (2012.01)
*B62D 15/02* (2006.01)

(56) References Cited

FOREIGN PATENT DOCUMENTS

| | | |
|---|---|---|
| JP | 2008143337 | 6/2008 |
| JP | 2012111263 | 6/2012 |
| KR | 10-2010-0072386 | 7/2010 |
| KR | 2013121386 A | 11/2013 |
| KR | 10-2016-0050903 A | 5/2016 |

* cited by examiner

PARKING ASSISTANCE APPARATUS AND VEHICLE INCLUDING THE SAME

CROSS-REFERENCE TO RELATED APPLICATIONS

The present application claims priority under 35 U.S.C. 119 and 35 U.S.C. 365 to Korean Patent Application No. 10-2016-0103187 filed on Aug. 12, 2016, which is hereby incorporated by reference in its entirety.

TECHNICAL FIELD

The present invention relates to a parking assistance apparatus and a vehicle including the same.

BACKGROUND

Today, with the development of technology and the improvement of environment, human lifespan has extended remarkably and therefore, the ratio of old people to total population increases every day.

Also, with the increase in population of old people, the accident rate for the old people is increasing with respect to the total accident rate. The reason for this is that, as people get older, people are slow in recognizing and responding to surrounding environments. Also, with the development of technology, vehicles are essential to mankind like theirs hands and feet and the age at which people begin driving is decreasing.

As described above, the increase in old drivers and young drivers raise a possibility that accidents occur due to lack of proficiency in driving a vehicle. In particular, there is a survey indicating that inexperienced drivers and old people find it hardest to park a vehicle when driving the vehicle.

Therefore, many vehicle manufacturers have actively developed technologies for automatically parking a vehicle without an operation of a driver, and the leading technology among the technologies is an automatic parking technology.

The automatic parking technology is a function for searching for and recognizing an available parking space for a vehicle by using sensors mounted on the vehicle and allowing the vehicle by itself to be automatically parked in the found parking space without a driving operation of a driver. The automatic parking technology has been developed from a function for assisting only a steering operation into a function for automatically changing a gear as well as operating a brake and an accelerator.

On the other hand, in the case of an existing automatic parking function, when a manual operation of a driver occurs during automatic parking of a vehicle, the automatic parking function is released since it is recognized that an emergency situation occurs.

The driver may want to release the automatic parking function and operate her or his own vehicle through the manual operation. On the other hand, the manual operation of the user may be caused by a simple mistake or may be made depending on situations with various intentions, such as in order to cope with a current situation or change current parking settings. In the majority of cases, drivers may want a vehicle to be parked in a target parking position.

Therefore, user inconvenience may be caused when the automatic parking function is released in response to the manual operation without grasping the intention of the driver with respect to the manual operation.

SUMMARY

The present invention has been made in an effort to solve the above-mentioned problems occurring in the prior art, and an object of the present invention is to provide a parking assistance apparatus and a vehicle including the same, which detect a brake, accelerator, or steering operation of a driver, grasp the driver's intention for the manual operation, and perform an automatic parking function while reflecting the grasped driver's intention, thus providing a convenient and safe automatic parking function.

In an embodiment, a parking assistance apparatus includes a sensor unit configured to sense vehicle surroundings; an interface unit configured to receive at least one of brake operation input information, accelerator operation input information, and steering operation input information; a display unit configured to display a graphic image for an automatic parking function; and a processor configured to set a target parking space based on information about the vehicle surroundings sensed by the sensor unit, design a parking path for directing a vehicle to the set target parking space, and perform the automatic parking function by performing control such that the vehicle follows the parking path wherein, when it is detected that there is an operation input of the user through the interface unit, the processor performs the automatic parking function by reflecting the operation input of the user or releases the automatic parking function.

The processor may receive the brake operation input information through the interface unit and when a brake operation value exceeds a predetermined value, pause the automatic parking function.

The processor may release the automatic parking function when a duration of a brake operation input exceeds a predetermined time.

The processor may resume the automatic parking function when a duration of a brake operation input is equal to or less than a predetermined time.

The processor may receive the brake operation input information through the interface unit and when a brake operation value is equal to or less than a predetermined value, maintain performance of the automatic parking function.

When a traveling speed of the vehicle is decreased according to a brake operation input, the processor may correct an automatic steering control value such that the vehicle follows the parking path at the decreased traveling speed, and perform control such that the vehicle continuously follows the parking path by controlling a steering with the corrected value.

When a basic traveling speed is set by a user in a state where the traveling speed is decreased to a first speed according to the brake operation input, the processor may perform the automatic parking function at the first speed as the basic traveling speed.

When the traveling speed is zero according to the brake operation input, the processor may pause the automatic parking function.

The processor may receive the accelerator operation input information through the interface unit and when an accelerator operation value exceeds a predetermined value, release the automatic parking function.

The processor may receive the accelerator operation input information through the interface unit and when an accelerator operation value is equal to or less than a predetermined value, maintain performance of the automatic parking function.

When the traveling speed is increased according to the accelerator operation input, the processor may correct an automatic steering control value such that the vehicle follows the parking path at the increased traveling speed, and perform control such that the vehicle continuously follows the parking path by controlling a steering with the corrected value.

When a basic traveling speed is set by the user in a state where the traveling speed is increased to a second speed according to the acceleration operation input, the processor may perform the automatic parking function such that the vehicle travels at the second speed as the basic traveling speed.

When the vehicle deviates from the parking path which is previously designed due to acceleration of the vehicle, the processor may newly design a parking path for directing the vehicle to the target parking space and perform control such that the vehicle follows the newly-designed parking path.

The processor may receive the steering operation input information through the interface unit and, when a steering operation value exceeds a predetermined value, release the automatic parking function.

When there is a user input for resuming the automatic parking function after the automatic parking function is released, the processor may redesign a parking path for directing the vehicle to the target parking space from a current position and perform control such that the vehicle follows the redesigned parking path.

The processor may receive the steering operation input information through the interface unit and, when a steering operation value is equal to or less than a predetermined value, maintain performance of the automatic parking function.

The processor may redesign the parking path according to the steering operation value in a state where the vehicle stops.

The processor may redesign the parking path according to the steering operation value in a state where the vehicle travels.

When it is difficult to design the parking path according to the steering operation value, the processor may reset a new target parking space and redesigns a parking path for directing the vehicle to the new target parking space.

In another embodiment, a parking assistance apparatus includes a sensor unit configured to sense vehicle surroundings; a vehicle driving unit including a brake driving unit for operating according to a brake operation input from a user, a power source driving unit for operating according to an accelerator operation input, and a steering driving unit for operating according to a steering operation input; a display unit configured to display a graphic image for an automatic parking function; and a processor configured to set a target parking space based on information about the vehicle surroundings sensed by the sensor unit, design a parking path for directing a vehicle to the set target parking space, and perform control such that the vehicle follows the parking path by controlling the vehicle driving unit to perform the automatic parking function, wherein when it is detected that there is an operation input for the vehicle driving unit from the user, the control unit performs the automatic parking function by reflecting the operation input from the user.

According to the embodiments, the parking assistance apparatus may grasp the intention of the user based on the manual input for the driving operation and efficiently control the automatic parking function according to the grasped intention, thus achieving user convenience and safe parking of the vehicle.

Specifically, the parking assistance apparatus may analyze the degree and duration of the brake operation to grasp the intention of the user and effectively control the automatic parking function according to the grasped intention, thus enhancing user convenience and achieving safe parking of the vehicle.

Also, the parking assistance apparatus may analyze the degree and duration of the accelerator operation to grasp the intention of the user and effectively control the automatic parking function according to the grasped intention, thus enhancing user convenience and achieving safe parking of the vehicle.

Also, the parking assistance apparatus may analyze the degree of the steering operation and a change in position of the vehicle due to the steering operation to grasp the intention of the user and effectively control the automatic parking function according to the grasped intention, thus enhancing user convenience and achieving safe parking of the vehicle.

DETAILED DESCRIPTION

Figure 1:
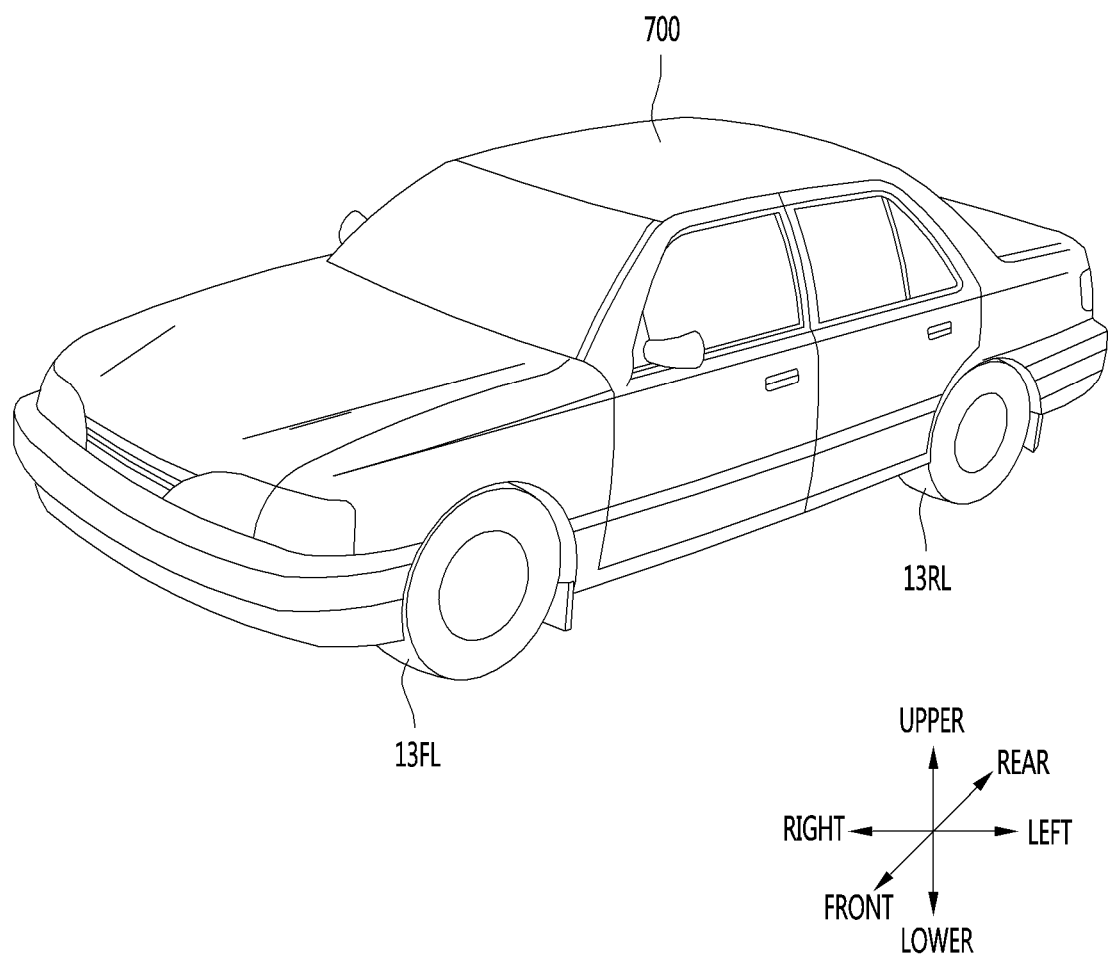
FIG. 1 is a diagram showing the appearance of a vehicle having a parking assistance apparatus according to an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are used only in consideration of ease in preparation of the specification, and do not have distinct meanings. Accordingly, the suffixes "module" and "unit" may be used interchangeably. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions within the scope and sprit of the present invention.

It will be understood that although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless context clearly indicates otherwise.

In the present application, it will be further understood that the terms "comprises", "includes," etc., specify the presence of stated features, integers, steps, operations, elements, components, or combinations thereof, but do not preclude the presence or addition of one or more other features, integers, steps, operations, elements, components, or combinations thereof.

A vehicle as described in this specification may include a car and a motorcycle. Hereinafter, a car will be focused upon.

A vehicle as described in this specification may include all of an internal combustion engine vehicle including an engine as a power source, a hybrid vehicle including both an engine and an electric motor as a power source, and an electric vehicle including an electric motor as a power source.

In the following description, the left of a vehicle means the left of the vehicle in the direction of travel and the right of the vehicle means the right of the vehicle in the direction of travel.

In the following description, a left hand drive (LHD) vehicle will be focused upon unless otherwise stated.

In the following description, the parking assistance apparatus is provided in a vehicle to exchange information necessary for data communication with the vehicle and to perform a driver assistance function. A set of some units of the vehicle may be defined as a parking assistance apparatus.

When the parking assistance apparatus is separately provided, at least some units (see FIG. 2) of the parking assistance apparatus are not included in the parking assistance apparatus but may be units of the vehicle or units of another apparatus mounted in the vehicle. Such external units transmit and receive data via an interface of the parking assistance apparatus and thus may be understood as being included in the parking assistance apparatus.

In the following description, for convenience of description, assume that the parking assistance apparatus according to the embodiment directly includes the units shown in FIG. 2.

Hereinafter, the parking assistance apparatus according to the embodiment will be described in detail with reference to the drawings.

Referring to FIG. 1, a vehicle according to an embodiment may include wheels 13FL and 13RL that rotate by a power source, and a parking assistance apparatus 100 providing an automatic parking function.

The parking assistance apparatus 100 according to the present embodiment may design a parking path from a current position to a target parking position when the target parking position is determined and perform control such that a vehicle follows the parking path, thus providing the automatic parking function for allowing the vehicle to be automatically parked.

Specifically, in a case where the vehicle follows the parking path after the automatic parking function has been performed, when a user's manual input for a driving operation is detected, the parking assistance apparatus 100 according to the present embodiment may perform control such that the vehicle follows the parking path while reflecting the manual input for the driving operation. In this case, the parking assistance apparatus 100 grasps the intention of the user based on the manual input for the driving operation and effectively controls the automatic parking function according to the grasped intention, thus enhancing user convenience and achieving safe parking of the vehicle.

The components of the parking assistance apparatus 100 will be described below in detail with reference to FIG. 2.

Figure 2:
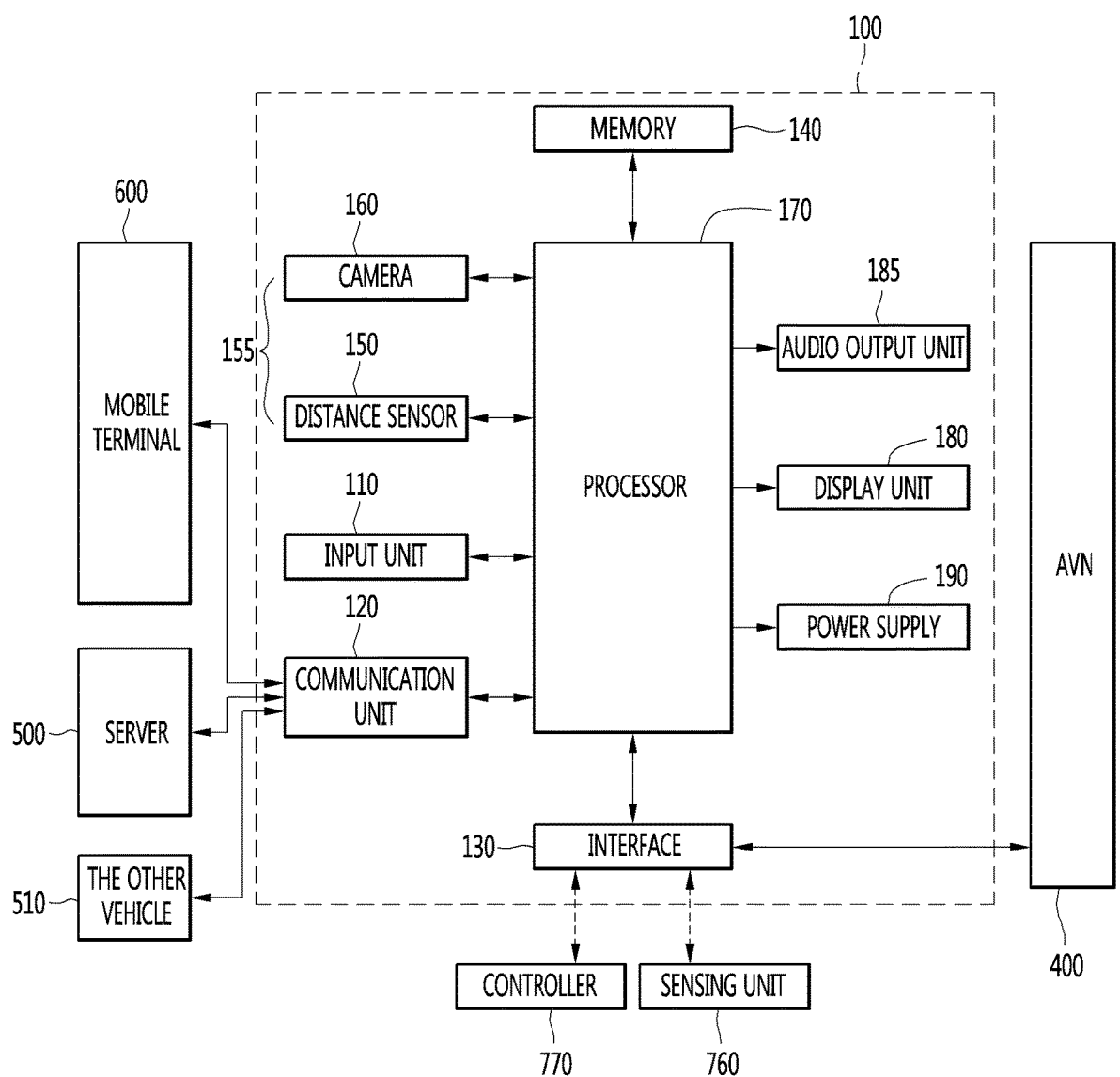
FIG. 2 is a block diagram of a parking assistance apparatus according to an embodiment of the present invention.

Referring to FIG. 2, the parking assistance apparatus 100 may include an input unit 110, a communication unit 120, an interface unit 130, a memory 140, a sensor unit 155, a processor 170, a display unit 180, an audio output unit 185, and a power supply 190. However, since the units of the parking assistance apparatus 100 shown in FIG. 2 are not essential for implementing the parking assistance apparatus 100, the parking assistance apparatus 100 to be described in the present invention may have more or less components than those enumerated above.

Each component will now be described in detail. The parking assistance apparatus 100 may include the input unit 110 for receiving user input.

A user may perform input for settings of an automatic parking function provided by the parking assistance apparatus 100 or turn on/off a power supply of the parking assistance apparatus 100, through the input unit 110.

For example, the input unit 110 may detect an input for performing the automatic parking function, an input for setting a target parking position, an input for setting a parameter of the automatic parking function, or the like.

The input unit 110 may include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

The input unit 110 may include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

The parking assistance apparatus 100 may receive, through the communication unit 120, at least one of navigation information, another vehicle's driving information, and traffic information, and use it as automatic parking information for performing the automatic parking function. On the other hand, the parking assistance apparatus 100 may transmit information on a host vehicle through the communication unit 120.

In an embodiment, the communication unit 120 may receive navigation information to aid in determining a current position of the vehicle and receive parking lot map information, information about an empty parking space, and the like, thus receiving automatic parking information.

Also, in an embodiment, the communication unit 120 may receive a user operation input for at least one of a brake, an accelerator, and a steering, and transfer the operation input to the processor 170 to aid in the user's remote control for the vehicle.

In detail, the communication unit 120 may receive at least one of position information, weather information and road traffic condition information (e.g., transport protocol experts group (TPEG), etc.) from the mobile terminal 600 and/or the server 500.

The communication unit 120 may receive traffic information from the server 500 having an intelligent traffic system (ITS). Here, the traffic information may include traffic signal information, lane information, vehicle surrounding information or position information.

In addition, the communication unit 120 may receive navigation information from the server 500 and/or the mobile terminal 600. Here, the navigation information may include at least one of map information related to vehicle driving, lane information, vehicle position information, set destination information and route information according to the destination.

For example, the communication unit 120 may receive the real-time position of the vehicle as the navigation information. In detail, the communication unit 120 may include a global positioning system (GPS) module and/or a Wi-Fi (Wireless Fidelity) module and acquire the position of the vehicle.

In addition, the communication unit 120 may receive driving information of the other vehicle 510 from the other vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information, and turn signal information.

In addition, when a user rides in the vehicle, the mobile terminal 600 of the user and the parking assistance apparatus 100 may pair with each other automatically or by executing a user application.

The communication unit 120 may exchange data with the other vehicle 510, the mobile terminal 600 or the server 500 in a wireless manner.

In detail, the communication unit 120 can perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

In addition, the parking assistance apparatus 100 may pair with the mobile terminal located inside the vehicle using a short-range communication method and wirelessly exchange data with the other vehicle 510 or the server 500 using a long-distance wireless communication module of the mobile terminal.

Next, the parking assistance apparatus 100 may include the interface 130 for receiving data of the vehicle and transmitting a signal processed or generated by the processor 170.

Specifically, the parking assistance apparatus 100 may receive at least one of driving information of another vehicle, navigation information, and sensor information through the interface unit 130 and use it as the automatic parking information.

In an embodiment, the interface unit 130 may receive the user's manual input information for a driving operation through the sensor unit 155 of the vehicle or from a driving operation unit 721 (see FIG. 27) directly. The processor 170 grasps the the user's intention for the manual operation by analyzing the manual input information of the driving operation and performs the automatic parking function in conformity with the user's intention, thus enhancing user convenience.

Also, the parking assistance apparatus 100 may transmit a vehicle control signal for performing the automatic parking function, information generated by the parking assistance apparatus 100, or the like to the controller 770 of the vehicle through the interface unit 130.

In an embodiment, the interface unit 130 may transmit the vehicle control signal generated by the processor 170 to a vehicle drive unit 750 (see FIG. 27) through the controller 770 or directly to allow the vehicle to be automatically controlled, thus performing the automatic parking function.

For example, the interface unit 130 generates at least one of an accelerator control signal for accelerating the vehicle, a brake control signal for decelerating/stopping the vehicle, a steering control signal for changing the steering of the vehicle, and a gear control signal for changing a gear of the vehicle and transmits it to the vehicle drive unit 750 to allow the vehicle to be driven according to the control signal.

To this end, the interface 130 may perform data communication with at least one of the controller 770 of the vehicle, an audio-video-navigation (AVN) apparatus 400 and the sensing unit 760 using a wired or wireless communication method.

In detail, the interface 130 may receive navigation information by data communication with the controller 770, the AVN apparatus 400 and/or a separate navigation apparatus.

In addition, the interface 130 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, a door sensor, etc. The position module may include a GPS module for receiving GPS information.

The interface 130 may receive user input via the user input unit 110 of the vehicle. The interface 130 may receive user input from the input unit of the vehicle or via the controller 770. That is, when the input unit is provided in the vehicle, user input may be received via the interface 130.

In addition, the interface 130 may receive traffic information acquired from the server. The server 500 may be located at a traffic control surveillance center for controlling traffic. For example, when traffic information is received from the server 500 via the communication unit 120 of the vehicle, the interface 130 may receive traffic information from the controller 770.

Next, the memory 140 may store a variety of data for overall operation of the parking assistance apparatus 100, such as a program for processing or control of the processor 170.

In addition, the memory 140 may store data and commands for operation of the parking assistance apparatus 100 and a plurality of application programs or applications executed in the parking assistance apparatus 100. At least some of such application programs may be downloaded from an external server through wireless communication. At least one of such application programs may be installed in the parking assistance apparatus 100 upon release, in order to provide the basic function (e.g., the driver assistance information guide function) of the parking assistance apparatus 100.

Such application programs may be stored in the memory 140 and may be executed to perform operation (or function) of the parking assistance apparatus 100 by the processor 170.

The memory 140 may store data for checking an object included in an image. For example, the memory 140 may store data for checking a predetermined object using a predetermined algorithm when the predetermined object is detected from an image of the vicinity of the vehicle acquired through the camera 160.

For example, the memory 140 may store data for checking the object using the predetermined algorithm when the predetermined algorithm such as a lane, a traffic sign, a two-wheeled vehicle and a pedestrian is included in an image acquired through the camera 160.

The memory 140 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the parking assistance apparatus 100 may operate in association with a network storage for performing a storage function of the memory 140 over the Internet.

Next, the parking assistance apparatus 100 may further include the sensor unit 155 for sensing objects located in the vicinity of the vehicle. The parking assistance apparatus 100 may include the sensor unit 155 for sensing peripheral objects and may receive the sensor information obtained by the sensing unit 770 of the vehicle via the interface 130. The acquired sensor information may be included in the information on the parking assistance information.

According to an embodiment, the sensor unit 155 may detect an empty available parking space by scanning the surroundings of the vehicle, when the empty parking space is set as a target parking space, detect an object between the target parking space and the vehicle, and provide information necessary for the processor 170 to design a parking path.

The sensor unit 155 may include at least one of a distance sensor 150 for sensing the position of an object located in the vicinity of the vehicle and a camera 160 for capturing the image of the vicinity of the vehicle.

First, the distance sensor 150 may accurately sense the position of the object located in the vicinity of the vehicle, a distance between the object and the vehicle, a movement direction of the object, etc. The distance sensor 150 may continuously measure the position of the sensed object to accurately sense change in positional relationship with the vehicle.

The distance sensor 150 may sense the object located in at least one of the front, rear, left and right areas of the vehicle. The distance sensor 150 may be provided at various positions of the vehicle.

Figure 3:
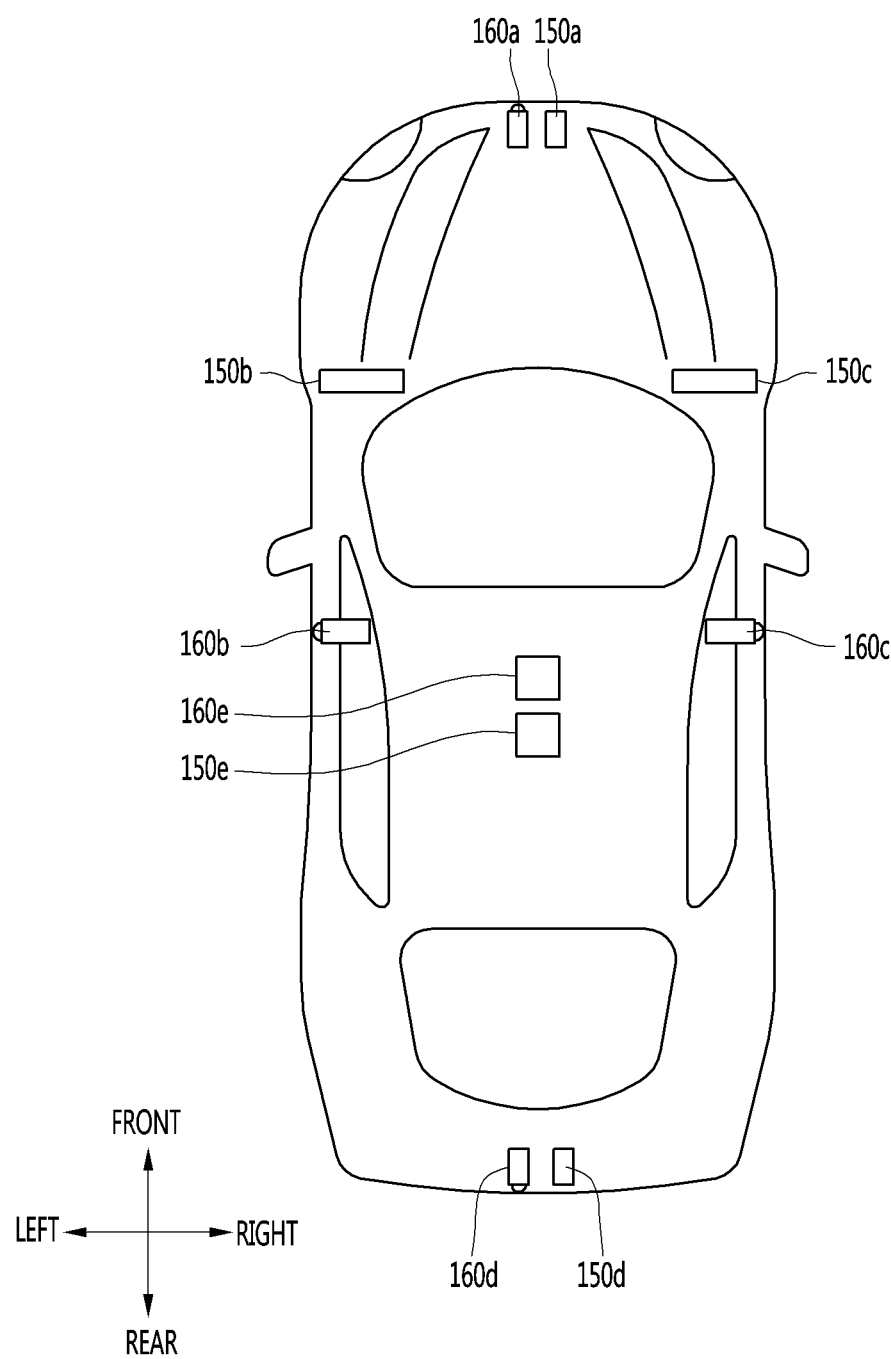
FIG. 3 is a plan view of a vehicle having a parking assistance apparatus according to an embodiment of the present invention.

In detail, referring to FIG. 3, the distance sensor 150 may be provided at at least one of the front, rear, left and right sides and ceiling of the vehicle.

The distance sensor 150 may include at least one of various distance measurement sensors such as a Lidar sensor, a laser sensor, an ultrasonic wave sensor and a stereo camera.

For example, the distance sensor 150 is a laser sensor and may accurately measure a positional relationship between the vehicle and the object using a time-of-flight (TOF) and/or a phase-shift method according to a laser signal modulation method.

Information on the object may be acquired by analyzing the image captured by the camera 160 at the processor 170.

In detail, the parking assistance apparatus 100 may capture the image of the vicinity of the vehicle using the camera 160, analyze the image of the vicinity of the vehicle using the processor 170, detect the object located in the vicinity of the vehicle, determine the attributes of the object and generate sensor information.

The image information is at least one of the type of the object, traffic signal information indicated by the object, the distance between the object and the vehicle and the position of the object and may be included in the sensor information.

In detail, the processor 170 may detect the object from the captured image via image processing, track the object, measure the distance from the object, and check the object to analyze the object, thereby generating image information.

The camera 160 may be provided at various positions.

In detail, the camera 160 may include an internal camera 160f for capturing an image of the front side of the vehicle within the vehicle and acquiring a front image.

Referring to FIG. 3, a plurality of cameras 160 may be provided at least one of the front, rear, right and left and ceiling of the vehicle.

In detail, the left camera 160b may be provided inside a case surrounding a left side mirror. Alternatively, the left camera 160b may be provided outside the case surrounding the left side mirror. Alternatively, the left camera 160b may be provided in one of a left front door, a left rear door or an outer area of a left fender.

The right camera 160c may be provided inside a case surrounding a right side mirror. Alternatively, the right camera 160c may be provided outside the case surrounding the right side mirror. Alternatively, the right camera 160c may be provided in one of a right front door, a right rear door or an outer area of a right fender.

In addition, the rear camera 160d may be provided in the vicinity of a rear license plate or a trunk switch. The front camera 160a may be provided in the vicinity of an emblem or a radiator grill.

The processor 170 may synthesize images captured in all directions and provide an around view image viewed from the top of the vehicle. Upon generating the around view image, boundary portions between the image regions occur. Such boundary portions may be subjected to image blending for natural display.

In addition, the ceiling camera 160e may be provided on the ceiling of the vehicle to capture the image of the vehicle in all directions.

The camera 160 may directly include an image sensor and an image processing module. The camera 160 may process a still image or a moving image obtained by the image sensor (e.g., CMOS or CCD). In addition, the image processing module processes the still image or the moving image acquired through the image sensor, extracts necessary image information, and delivers the extracted image information to the processor 170.

Next, the parking assistance apparatus 100 may further include a display unit 180 which displays a graphic image associated with the automatic parking function.

In an embodiment, the display unit 180 may provide a graphic user interface for allowing the user to set the automatic parking function, such as a screen for setting a target parking space, by displaying a graphic image of an empty parking space on a vehicle surroundings image. Also, the display unit 180 may display the vehicle surroundings image and other items (for example, a vehicle speed, a steering operation value, a predicted parking path, or the like) in order to allow the user to check whether the vehicle is safely parked when the vehicle follows the parking path.

The display unit 180 may include a plurality of displays.

In detail, the display unit 180 may include a first display 180a for projecting and displaying a graphic image onto and on a vehicle windshield W. That is, the first display 180a is a head up display (HUD) and may include a projection module for projecting the graphic image onto the windshield W. The graphic image projected by the projection module may have predetermined transparency. Accordingly, a user may simultaneously view the front and rear sides of the graphic image.

The graphic image may overlap the image projected onto the windshield W to achieve augmented reality (AR).

The display unit may include a second display 180b separately provided inside the vehicle to display an image of the driver assistance function.

In detail, the second display 180b may be a display of a vehicle navigation apparatus or a cluster located at an internal front side of the vehicle.

The second display 180b may include at least one selected from among a Liquid Crystal Display (LCD), a Thin Film Transistor LCD (TFT LCD), an Organic Light Emitting Diode (OLED), a flexible display, a 3D display, and an e-ink display.

The second display 180b may be combined with a touch input unit to achieve a touchscreen.

Next, the audio output unit 185 may audibly output a message for explaining the function of the parking assistance apparatus 100 and checking whether the automatic parking function is performed. That is, the parking assistance apparatus 100 may provide explanation of the function of the parking assistance apparatus 100 via visual display of the display unit 180 and audio output of the audio output unit 185.

Next, the haptic output unit may output an alarm for the driver assistance function in a haptic manner. For example, the parking assistance apparatus 100 may output vibration to the user when a warning is included in at least one of navigation information, traffic information, communication information, vehicle state information, advanced driver assistance system (ADAS) function and other driver convenience information.

The haptic output unit may provide directional vibration. For example, the haptic output unit may be provided in a steering apparatus for controlling steering to output vibration. Left or right vibration may be output according to the left and right sides of the steering apparatus to enable directional haptic output.

In addition, the power supply 190 may receive power and supply power necessary for operation of the components under control of the processor 170.

Lastly, the parking assistance apparatus 100 may include the processor 170 for controlling overall operation of the units of the parking assistance apparatus 100.

In addition, the processor 170 may control at least some of the components described with reference to FIG. 3 in order to execute the application program. Further, the processor 170 may operate by combining at least two of the components included in the parking assistance apparatus 100es, in order to execute the application program.

The processor 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors 170, and electric units for the implementation of other functions.

The processor 170 may be controlled by the controller or may control various functions of the vehicle through the controller.

The processor 170 may control overall operation of the parking assistance apparatus 100 in addition to operation related to the application programs stored in the memory 140. The processor 170 may process signals, data, information, etc., via the above-described components or execute the application programs stored in the memory 170 to provide appropriate information or functions to the user.

A method of providing an automatic parking function in the parking assistance apparatus 100 will be described in detail below with reference to FIGS. 5 to 26.

Figure 5:
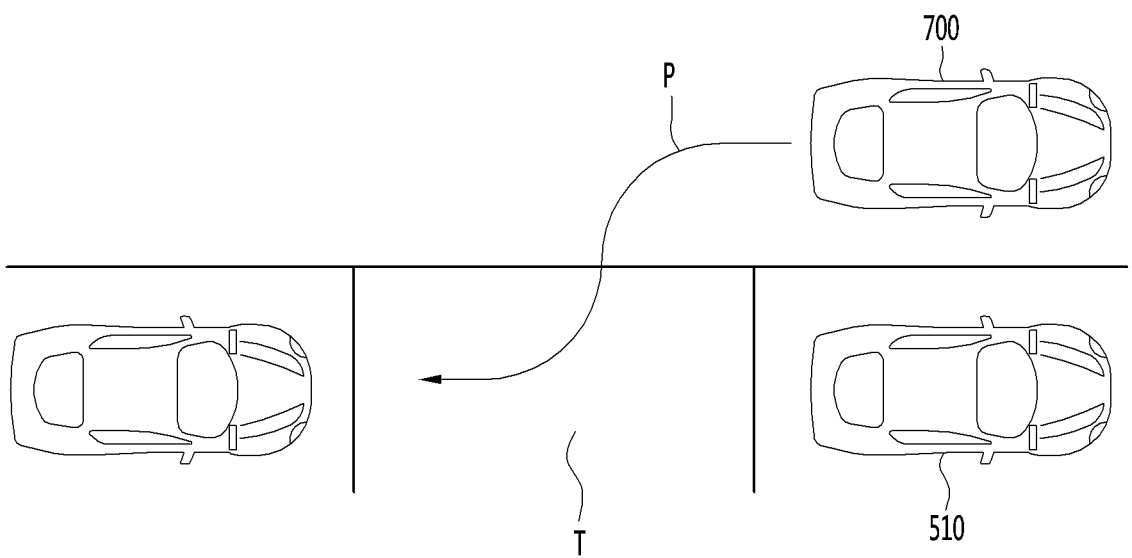
FIG. 5 illustrates a case where a parking assistance apparatus performs parking at a target parking position according to an embodiment.
Figure 6:
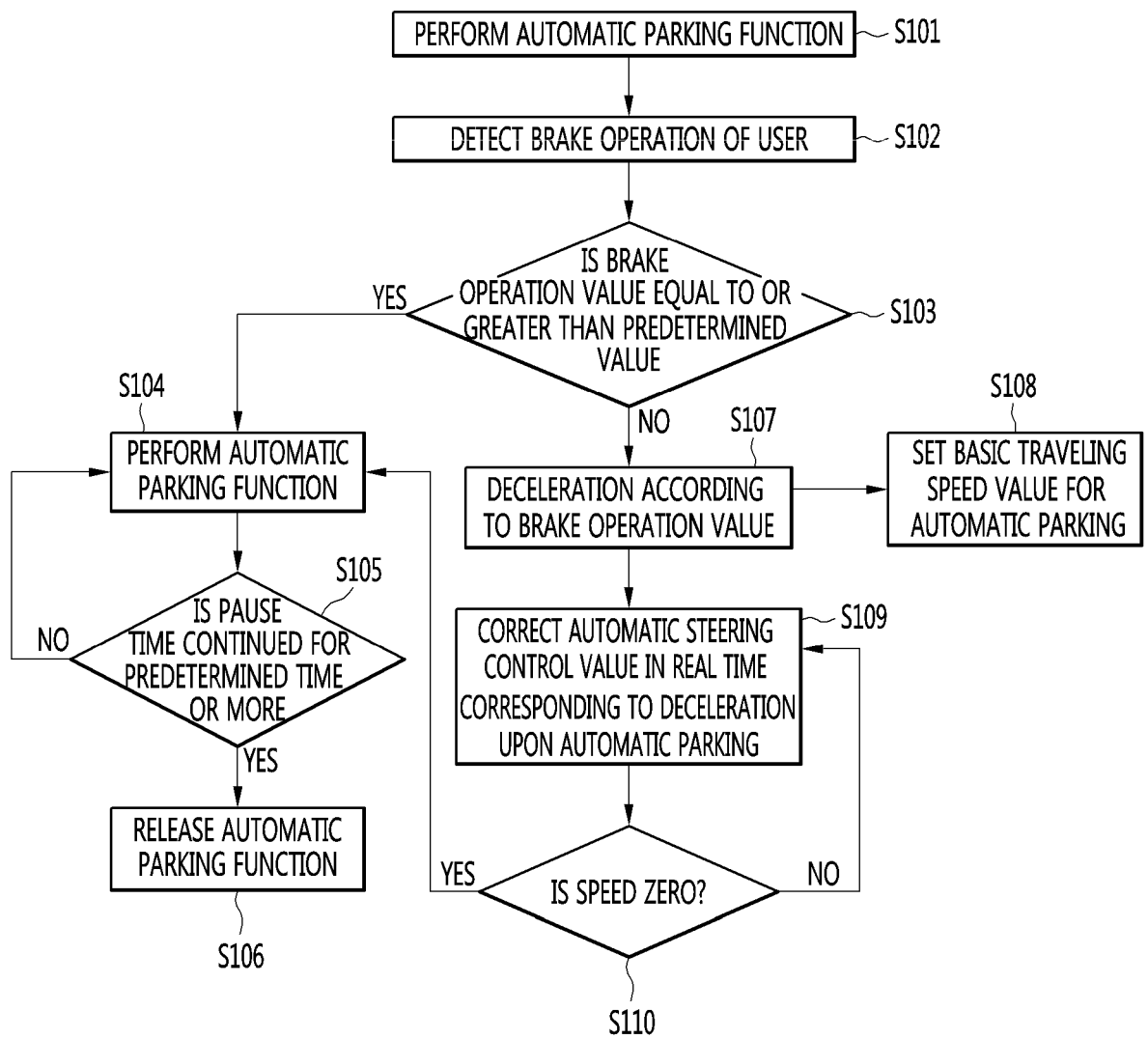
FIG. 6 is a flowchart of a method of performing an automatic parking function when there occurs intervention by a brake operation during performance the automatic parking function according to an embodiment.

Referring to FIG. 5, the parking assistance apparatus 100 searches for an empty available parking space through the sensor unit 155 and the communication unit 120 and determines one of founded available parking spaces as a target parking space T through user settings or automatic settings. Next, the parking assistance apparatus 100 designs a parking path P for directing the vehicle from a current position of the vehicle to the target parking space T and automatically controls the drive unit 750 of the vehicle (see FIG. 27) such that the vehicle follows the parking path P, thus providing the automatic parking function for automatically parking the vehicle in the target parking space T.

In this case, the sensor unit 155 detects a situation where the vehicle travels to the target parking space and displays the detected situation of vehicle surroundings to aid in allowing the user to check whether the vehicle is safely and automatically parked.

On the other hand, when the parking assistance apparatus 100 automatically controls the vehicle, the user may manually input a driving operation to intervene in the automatic control by the parking assistance apparatus 100.

For example, the user may perform a brake operation with various intentions, such as when seeing an obstacle which is not detected by the parking assistance apparatus 100, when thinking that the vehicle travels at a high speed, or when wanting to change a target parking space T.

Also, the user may perform an accelerator (acceleration) operation with various intentions, such as when it is required to avoid an obstacle, when thinking that the vehicle travels at a low speed, when a wheel gets caught in an obstacle or the like and it is required to get out of the obstacle, when it is required to release the automatic parking function, or the like.

Also, the user may perform a steering operation with various intentions, such as, when it is required to avoid an obstacle, to correct a part of a designed automatic parking path, or to change the target parking space T.

The parking assistance apparatus 100 according to the present embodiment may provide the automatic parking function for grasping the intention of the user when the user intervenes in the automatic parking function and executing an appropriate algorithm, thus enhancing user convenience and achieving safe automatic parking of the vehicle.

First, a method of performing the automatic parking function in the parking assistance apparatus 100 when a brake operation is input during performance of the automatic parking function will be described in detail below with reference to FIGS. 6 to 11.

The parking assistance apparatus 100 may perform the automatic parking function (S101).

Specifically, the parking assistance apparatus 100 may initiate an automatic parking mode when a vehicle arrives at a destination or in response to a user input.

When the automatic parking mode is initiated, the sensor unit 155 of the parking assistance apparatus 100 senses vehicle surroundings and searches for an available parking space. In this case, the processor 170 may perform control such that the display unit 180 generates an around view image by converting an image generated by photographing the vehicle surroundings into a top view image and displays the generated around view image.

Specifically, according to an embodiment, the sensor unit 155 includes an around view monitoring camera, and the processor 170 may detect an available parking space in such a way to detect an empty space with a predetermined size or more from the around view image photographed by the around view monitoring camera. More specifically, the processor 170 detects a parking lane from the around view image and, when an object other than pavement (background) is not detected within the parking lane, detects a corresponding space as the available parking space.

Also, the sensor unit 155 may include a distance sensor, and measure a distance to an object in at least one side direction of the vehicle during movement of the vehicle and detect an empty space with the predetermined size or more, in which no object exists, as an available parking space.

When at least one available parking space is detected, the parking assistance apparatus 100 sets an available parking space selected by a user input or an available parking space automatically selected by a predetermined condition, as the target parking space T.

For example, when a plurality of available parking spaces are detected, the processor 170 may evaluate the available parking spaces according to at least one criterion and automatically set the highest-evaluated available parking space as the target parking space T. Specifically, the processor 170 may automatically set an available parking space located closest from an entrance of a destination as the target parking space T. Also, the processor 170 may automatically set an available parking space located closest from a current position of the vehicle as the target parking space T.

When the target parking space T is set, the parking assistance apparatus 100 may design a parking path P for directing the vehicle to the available parking space.

In addition, the parking assistance apparatus 100 may perform control such that the vehicle follows the parking path P. Specifically, in order to allow the vehicle to follow the parking path P, the processor 170 determines a traveling speed of the vehicle, a wheel direction (or steering control value) with respect to each position of the vehicle, a gear change value, or the like, performs planning of a control signal to be transmitted to the vehicle drive unit 750, and transmits the planned control signal to the vehicle drive unit 750, thus allowing the vehicle to automatically travel along the parking path P.

Although it is described that the parking assistance apparatus 100 determines a basic traveling speed of the vehicle as a creeping speed and automatically controls a steering based on the creeping speed to allow the vehicle to follow the parking path P, embodiments are not limited thereto. That is, the basic traveling speed may be changed by user settings.

When the vehicle is following a path according to automatic control, the user may perform a brake operation input. Specifically, the user may perform the brake operation input by pressing a brake pedal, or perform the brake operation input through a side brake, an engine brake, or a remote terminal.

The processor 170 may receive the user's brake operation input information through the interface unit 130 (S102).

Furthermore, when receiving the user's brake operation input information, the processor 170 may measure the degree of the brake operation and detect the user's intention for the brake operation (S103). That is, the processor 170 may determine whether to stop the automatic parking function depending on the degree of the brake operation of the user.

Figure 7A:
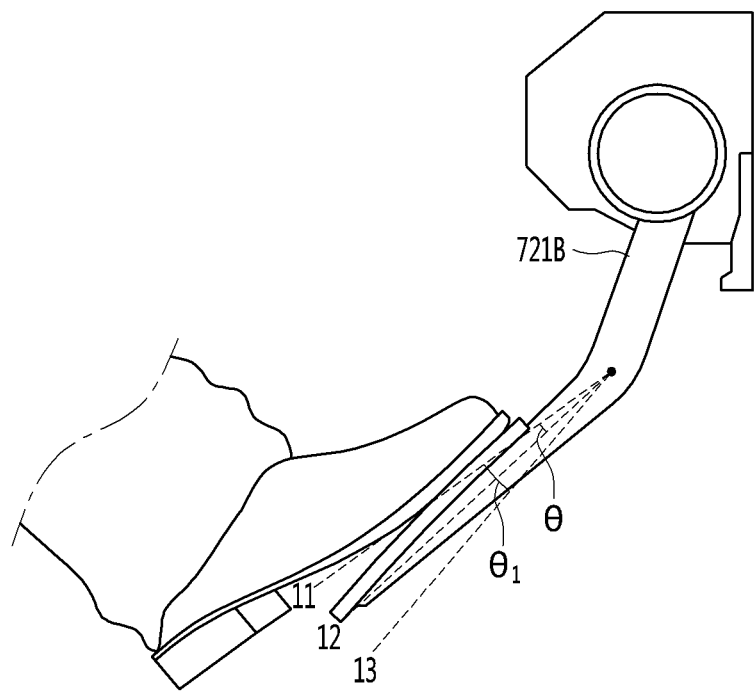
FIGS. 7A and 7B are diagrams for describing criteria for determining a degree of a brake operation of a user according to an embodiment.

Specifically, referring to FIG. 7A, when the user input the brake operation by pressing the brake pedal 721B, the processor 170 may determine the user's intention differently depending on whether the position 13 of the pedal moves beyond a first angle θ1 with respect to a position 11 of the pedal in a case where the brake operation is not performed, and control the automatic parking function in different manners.

Specifically, when the position the pedal moves to a position beyond the first angle θ1 since the user presses the pedal 721B, the processor 170 may determine that the intention of the user is to urgently stop the vehicle and pause the automatic parking function.

On the other hand, when the brake pedal 721B moves within the first angle θ1, the processor 170 may determine that the intention of the user is to decrease the traveling speed of the vehicle and continuously perform control such that the vehicle follows the parking path P while reflecting a brake operation value θ2 of the user.

Figure 7B:
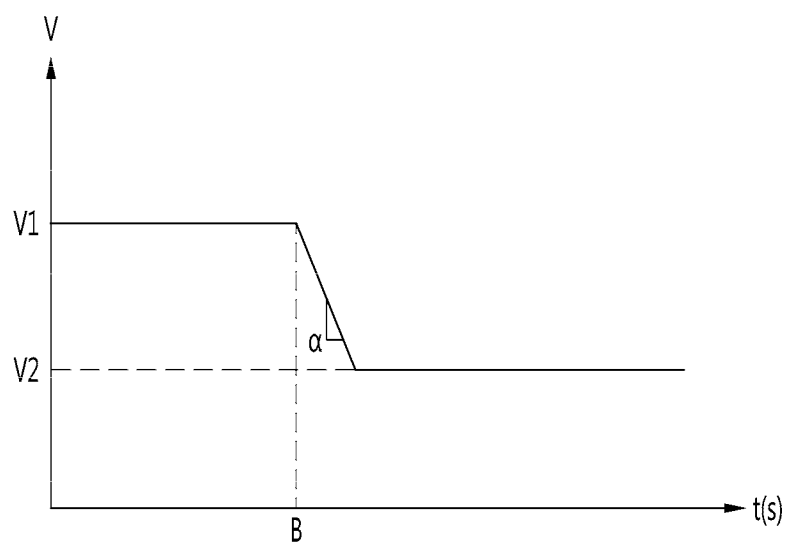

Also, referring to FIG. 7B, the processor 170 may determine that the intention of the user for the brake operation based on a deceleration value α by which the vehicle is decelerated. Specifically, when the deceleration value α in speed of the vehicle is less than a predetermined value (for example, −0.15 g> deceleration value), the processor 170 may determine that the intention of the user is to urgently stop the vehicle and pause the automatic parking function.

On the other hand, when the deceleration value α in speed of the vehicle exceeds the predetermined value (for example, −0.15 g< deceleration value), the processor 170 may determine that the intention of the user is to decelerate the traveling speed of the vehicle for automatic parking and continuously perform control such that the vehicle follows the parking path P while reflecting a brake operation value of the user, while performing the automatic parking function.

That is, the processor 170 may analyze the degree of the brake operation of the user and when the degree of the brake operation is greater than the predetermined value, pause the automatic parking function (S104). In this case, the pause of automatic parking means a state in which the vehicle stops, that is, a state in which the automatic parking function (for example, automatic steering control) is to be resumed in response to release of a stopped state.

Figure 8:
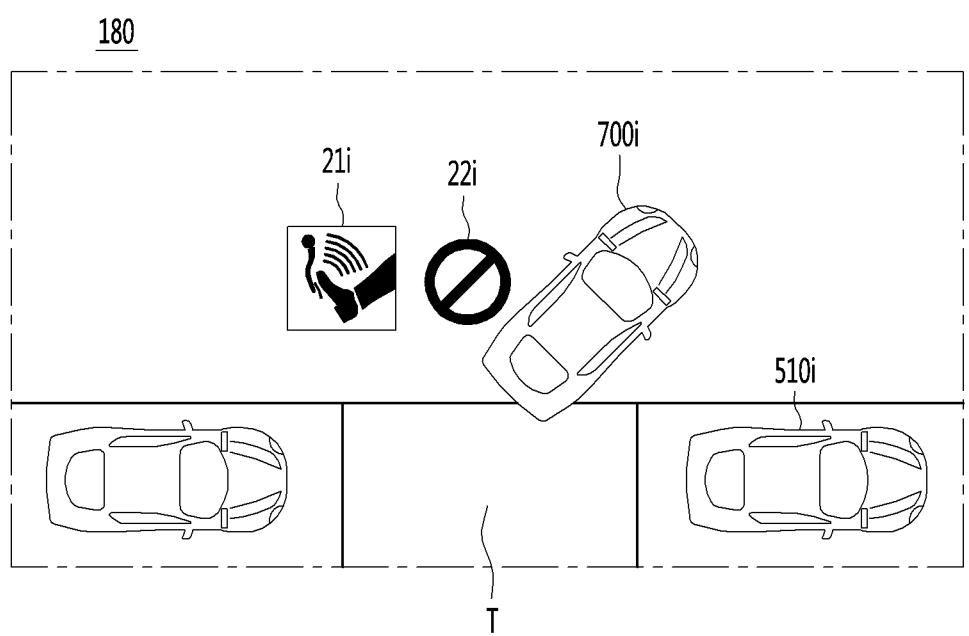
FIG. 8 is a diagram illustrating a display screen in a case where a brake operation value is greater than a predetermined value, according to an embodiment.

Referring to FIG. 8, the processor 170 may display, through the display unit 180, a graphic image 21*i* indicating that a brake operation input is performed and a graphic image 22*i* indicating that automatic parking function is paused, when the automatic parking function is paused by the brake operation of the user. Therefore, the user may know that automatic parking is paused by the brake operation of the user herself or himself through the display unit 180.

The user's intention to perform the brake operation input by urgently pressing the brake to exceed the predetermined value is for preventing collision with an obstacle, or for releasing the automatic parking function and switching to a manual driving mode. That is, after the user urgently presses the brake, the user may want to resume the automatic parking function or to release automatic parking function.

The processor 170 may determine the user's intention based on a duration for which the brake operation is maintained (S105).

Specifically, when the duration for which the brake operation input is maintained by the user exceeds a predetermined time, the processor 170 may determine that the user's intention is to release the automatic parking mode, and release the automatic parking function (S106).

That is, when the duration for which the brake operation input is maintained exceeds the predetermined time, the processor 170 may not perform steering control although the vehicle moves as the brake operation input of the user is released. That is, the automatic parking function is released and therefore, control is not performed such that the vehicle follows the parking path P.

On the contrary, when the duration for which the brake operation input is maintained is equal to or less than the predetermined time, the processor 170 may automatically control the steering of the vehicle such that the vehicle follows the parking path P when the vehicle moves as the brake operation input is reduced or released. That is, the processor 170 may resume the automatic parking function.

Figure 9:
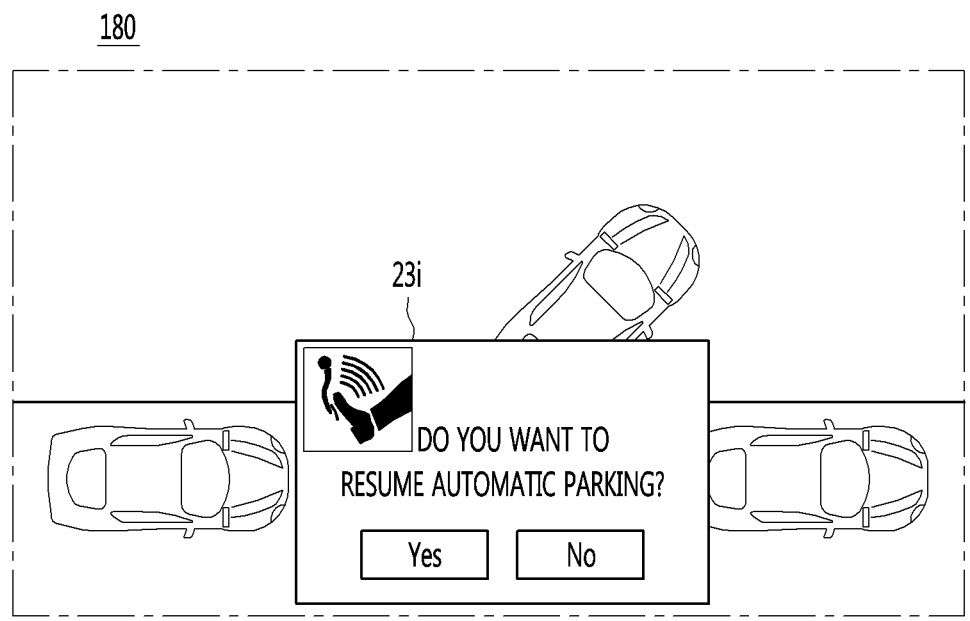
FIG. 9 is a diagram illustrating a display screen in a case where a brake operation is maintained for a predetermined time or more, according to an embodiment.

It is noted that, referring to FIG. 9, the processor 170 may provide a pop-up window 23*i* on the display unit 180 so as to allow the user to determine whether to resume the automatic parking function, in order to grasp the user's intention in a state in which the automatic parking function is released.

When the user resumes the automatic parking function, the parking assistance apparatus 100 may perform control such that the vehicle is automatically parked in the target parking space T which is previously selected.

Also, the parking assistance apparatus 100 may return back to the step for sensing situations of vehicle surroundings accurately and searching for an available parking space.

On the other hand, the processor 170 may maintain the performance of the automatic parking function when the brake operation value of the user is equal to or less than the predetermined value (S107).

Specifically, the processor 170 may maintain automatic steering control such that the vehicle continuously follows the parking path P although the traveling speed of the vehicle is decreased according to the brake operation value of the user.

Figure 10:
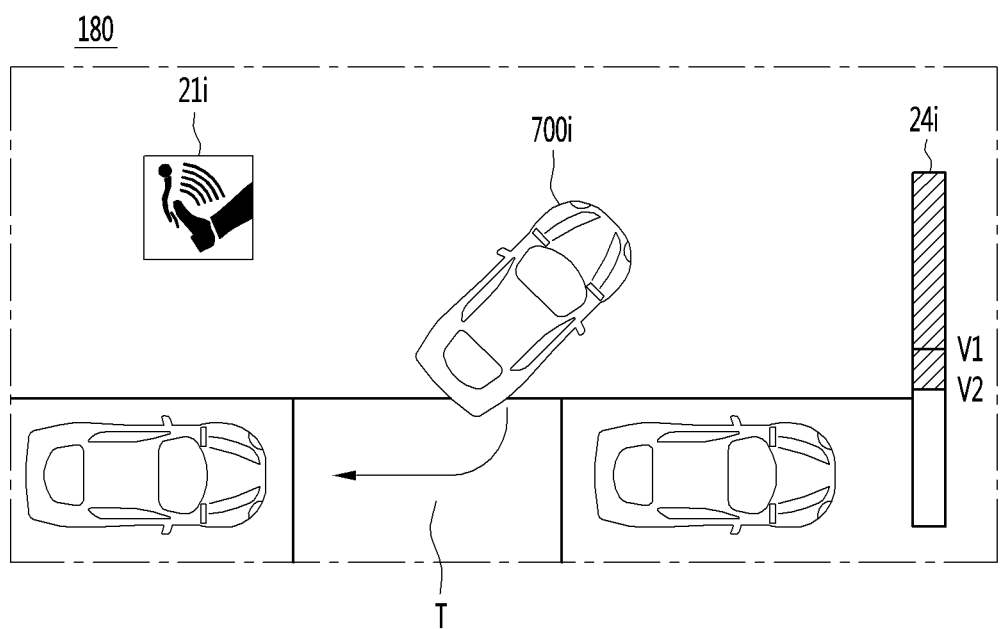
FIG. 10 is a diagram illustrating a display screen in a case where a brake operation value is equal to or less than a predetermined value, according to an embodiment.
Figure 11:
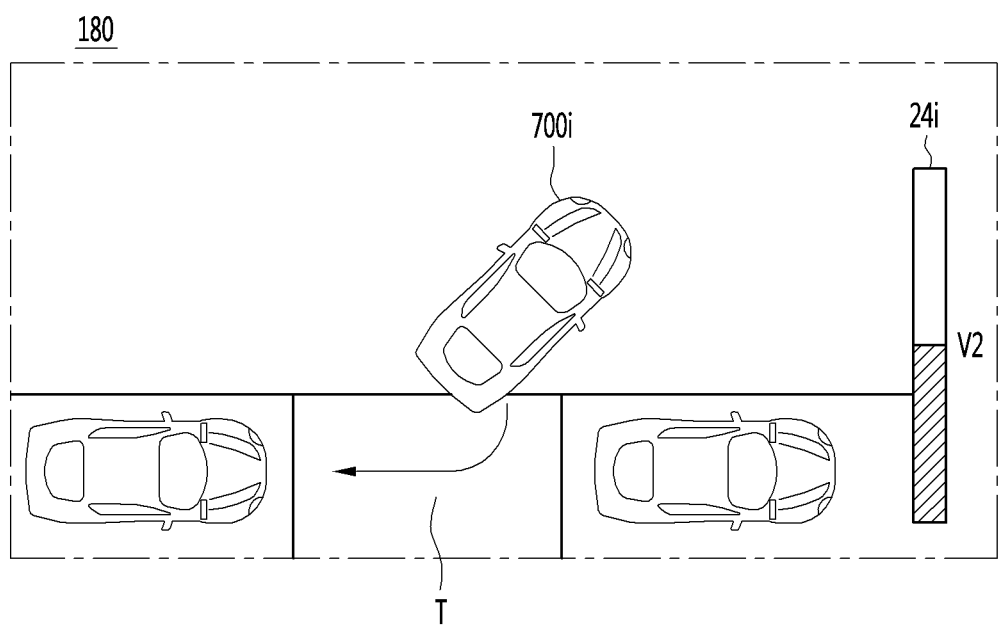
FIG. 11 is a diagram illustrating a display screen for setting a basic speed for automatic parking by reflecting a brake operation value of a user, according to an embodiment.
Figure 12:
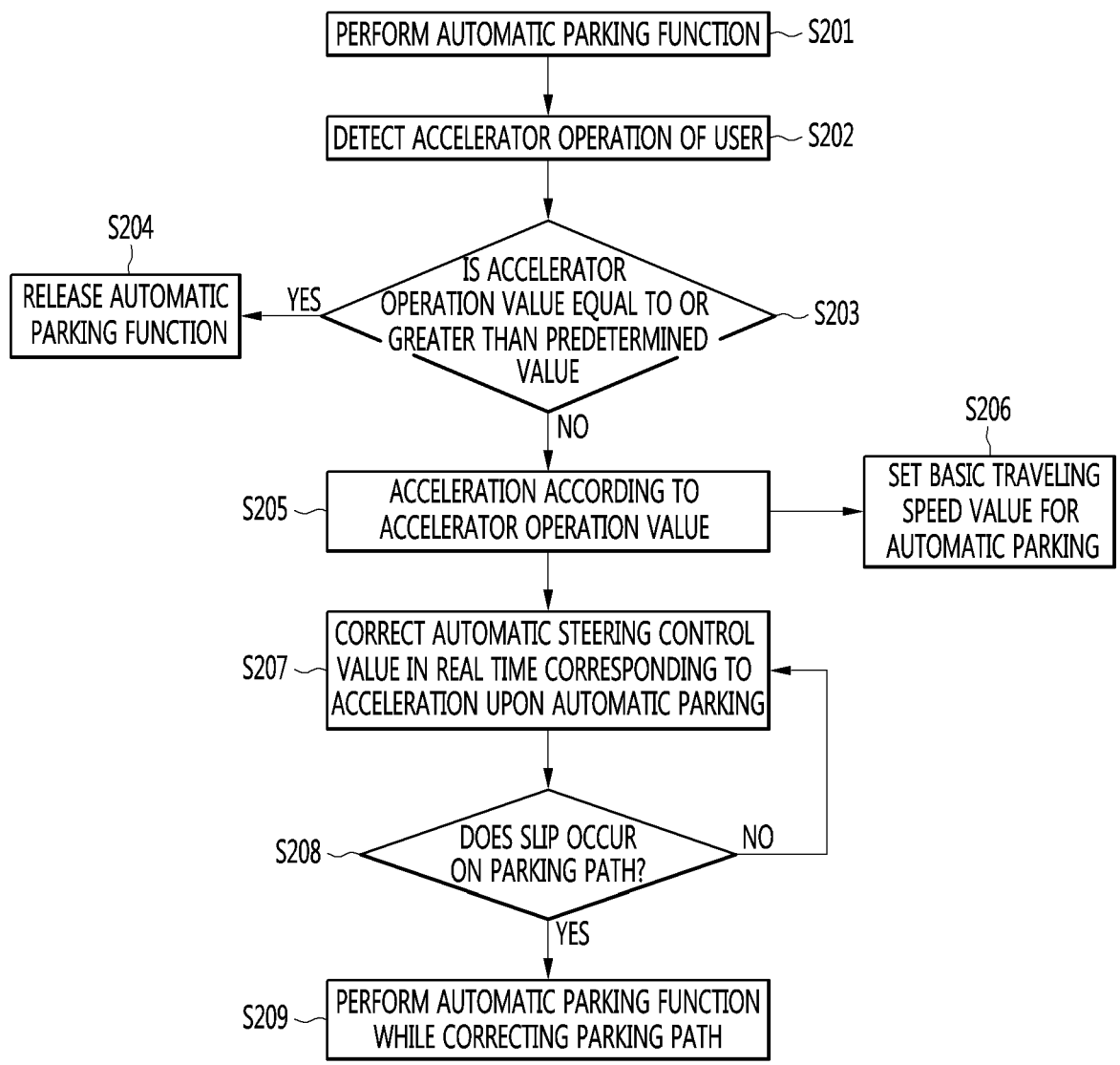
FIG. 12 is a flowchart of a method of performing an automatic parking function when there occurs intervention by an accelerator operation during performance the automatic parking function according to an embodiment.

Referring to FIG. 10, the traveling speed of the vehicle for parking may be decreased from a first speed (V1, basic traveling speed) to a second speed (V2) according to the brake operation of the user. The processor 170 displays a graphic image indicating that there is a brake operation input and a graphic image 24*i* indicating the basic traveling speed (first speed V1) of the vehicle and the real-time speed (second speed) of the vehicle along with the vehicle surroundings image, allowing the user to know that the traveling speed of the vehicle is decreased according to the brake operation input of the user herself or himself in real time.

The user may think that the basic traveling speed of the vehicle is high during automatic parking and perform the brake operation input. In a case where the user's intention is as described above, user inconvenience may be caused when the brake is finely controlled every time the automatic parking function is performed.

In the state where the traveling speed of the vehicle is decreased according to the brake operation input, when there is a user input for setting the current traveling speed as the basic traveling speed, the parking assistance apparatus 100 may perform resetting to set the basic traveling speed of the vehicle to the current traveling speed (S108).

When the basic traveling speed is set, the parking assistance apparatus 100 may perform control such that the vehicle automatically travels at the reset basic traveling speed in future automatic parking. That is, referring to FIG. 11, when there is a user input for setting the basic traveling speed while the vehicle is being automatically parked at the second speed V2, the parking assistance apparatus 100 may display the second speed V2 as the basic traveling speed and perform control such that the vehicle is automatically parked.

On the other hand, the processor 170 may continuously correct an automatic steering control value and control a steering based on the corrected value such that the vehicle follows the parking path P although the vehicle is decelerated according to the brake operation input (S109).

Accordingly, the predicted parking path P displayed on the display unit 180 may be continuously displayed without being changed in spite of the brake operation.

On the other hand, the parking assistance apparatus 100 may pause the automatic parking function when the vehicle speed becomes zero (0) by the brake operation although the brake operation input of the vehicle is equal to or less than the predetermined value (S110).

That is, the parking assistance apparatus 100 analyzes the degree and duration of the brake operation and the like to grasp the intention of the user and effectively controls the automatic parking function according to the grasped intention, thus enhancing user convenience and achieving safe parking of the vehicle.

Next, a method of performing the automatic parking function in the parking assistance apparatus 100 when an accelerator operation is input during performance of the automatic parking function will be described in detail below with reference to FIGS. 12 to 17.

First, the parking assistance apparatus 100 may perform the automatic parking function (S201).

Specifically, the parking assistance apparatus 100 may initiate an automatic parking mode when a vehicle arrives at a destination or in response to a user input.

When the automatic parking mode is initiated, the sensor unit 155 of the parking assistance apparatus 100 senses vehicle surroundings and searches for an available parking space. In this case, the processor 170 may perform control such that the display unit 180 generates an around view image by converting an image generated by photographing the vehicle surroundings into a top view image and displays the generated around view image.

Specifically, in an embodiment, the sensor unit 155 includes an around view monitoring camera and the processor 170 may detect an available parking space in such a way to detect an empty space with a predetermined size or more from the around view image photographed by the around view monitoring camera. More specifically, the processor 170 detects a parking lane from the around view image and when an object other than pavement (background) is not detected within the parking lane, detects a corresponding space as the available parking space.

Also, the sensor unit 155 may include a distance sensor, and measures a distance to an object in at least one side direction of the vehicle during movement of the vehicle and detect an empty space with the predetermined size in which no object exists, as an available parking space.

When at least one available parking space is detected, the parking assistance apparatus 100 sets an available parking space selected by a user input or an available parking space automatically selected by a predetermined condition, as the target parking space T.

For example, when a plurality of available parking spaces are detected, the processor 170 may evaluate the available parking spaces according to at least one criterion and automatically set the highest-evaluated available parking space as the target parking space T. Specifically, the processor 170 may automatically set an available parking space located closest from an entrance of a destination as the target parking space T. Also, the processor 170 may automatically set an available parking space located closest from a current position of the vehicle as the target parking space T.

When the the target parking space T is set, the parking assistance apparatus 100 may design a parking path P for directing the vehicle to the available parking space.

The parking assistance apparatus 100 may perform control such that the vehicle follows the parking path P. Specifically, in order to allow the vehicle to follow the parking path P, the processor 170 determines a traveling speed of the vehicle, a wheel direction (or steering control value) with respect to each position of the vehicle, a gear change value, or the like, performs planning of a driving-unit control signal, and transmits the planned driving-unit control signal, thus allowing the vehicle to automatically travel along the parking path P.

Although it is described that the parking assistance apparatus 100 determines a basic traveling speed of the vehicle as a creeping speed and automatically controls a steering based on the creeping speed to allow the vehicle to follow the parking path P, embodiments are not limited thereto. That is, the basic traveling speed may be changed by user settings.

When the vehicle is following a path according to automatic control, the user may perform an accelerator operation input. In this case, the accelerator operation input means an input for operating a driving unit for a power source of the vehicle. That is, the accelerator operation input may mean an input for controlling the degree of acceleration of the vehicle.

Specifically, the user can perform the accelerator operation input by pressing an accelerator pedal or by using a remote terminal.

The processor 170 may receive accelerator operation input information of the user through the interface unit 130 (S202).

Furthermore, when receiving the accelerator operation input information of the user, the processor 170 may measure the degree of the accelerator operation and detect the user's intention for the accelerator operation (S203). That is, the processor 170 may determine whether to stop the automatic parking function depending on the degree of the accelerator operation of the user.

Figure 13A:
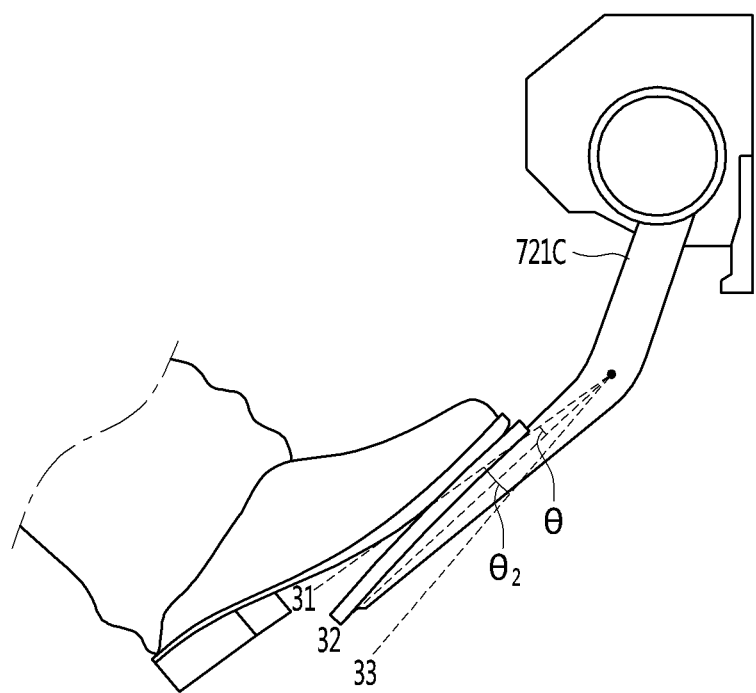
FIGS. 13A and 13B are diagrams for describing criteria for determining a degree of an accelerator operation of a user according to an embodiment.

Specifically, referring to FIG. 13A, when the user performs the accelerator operation input by pressing the accelerator pedal 721C, the processor 170 may determine the user's intention differently depending on whether the position 33 of the pedal moves beyond a second angle θ2 with respect to a position 31 of the pedal in the case where the accelerator operation is not performed and control the automatic parking function in different manners.

Specifically, when the pedal moves to a position beyond the second angle θ2 since the user presses the accelerator pedal 721C, the processor 170 may determine that the intention of the user is to release the automatic parking function of the vehicle and switch to a manual driving mode, and release the automatic parking mode. On the other hand, when the accelerator pedal 721C moves within the second angle θ2, the processor 170 may determine that the intention of the user is to increase the traveling speed of the vehicle or to increase the torque of the vehicle, and continuously perform control such that the vehicle follows the parking path P while reflecting the accelerator operation value θ of the user.

Also, the processor 170 may determine the user's intention by comparing a path through which the vehicle has moved according to the accelerator operation with a designed parking path P.

Figure 13B:
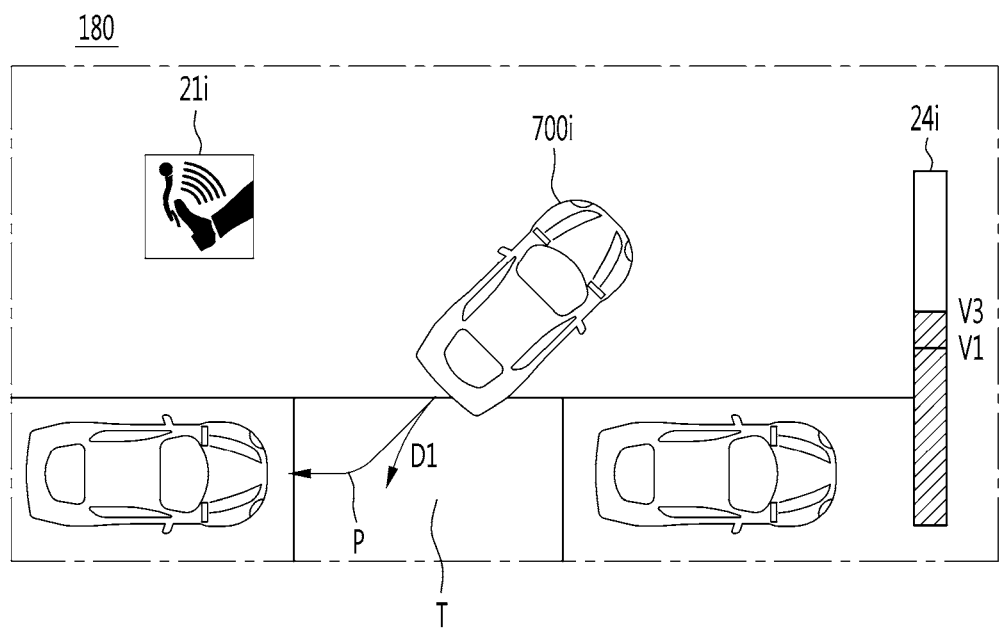

Referring to FIG. 13B, there may occur a case where the vehicle is instantaneously accelerated and deviates from the predicted parking path P. In this case, the processor 170 determines the user's intention by comparing the actual movement path D1 and the predicted parking path P and controls the automatic parking function in different manners.

For example, the processor 170 may not release the automatic parking mode when it is possible to design the predicted parking path P for directing the vehicle to the existing target parking space T from a position of the vehicle that deviates from the parking path P due to the instantaneous acceleration of the vehicle.

When it is difficult to design a parking path from a position of the vehicle that deviates from the parking path P due to the instantaneous acceleration of the vehicle, the processor 170 may release the automatic parking mode. A case where the processor 170 is difficult to design the parking path P again may mean a case where it is necessary to design a path due to an increase in the number of gear changes.

Also, the processor 170 may determine whether to release the automatic parking function based on an acceleration value of the vehicle. Specifically, in a case where the vehicle's wheel gets caught in a slope or an obstacle, when the user performs the accelerator operation input in order to get out of the slope or obstacle, the processor may accurately grasp the user's intention based on the actual acceleration value of the vehicle.

Therefore, when the acceleration value of the vehicle exceeds a predetermined value, the processor 170 may determine that the user's intention is to release the automatic parking function and release the automatic parking function.

On the other hand, when the acceleration value of the vehicle is equal to or less than a predetermined value, the processor 170 may determine that the user's intention is to drive the driving unit for the power source of the vehicle, and perform automatic steering control such that the vehicle follows the parking path P while maintaining the automatic parking function.

That is, the processor 170 may analyze the degree of the accelerator operation of the user with respect to various parameters, and when the degree of the accelerator operation is greater than the predetermined value, release the automatic parking function (S204).

Figure 14:
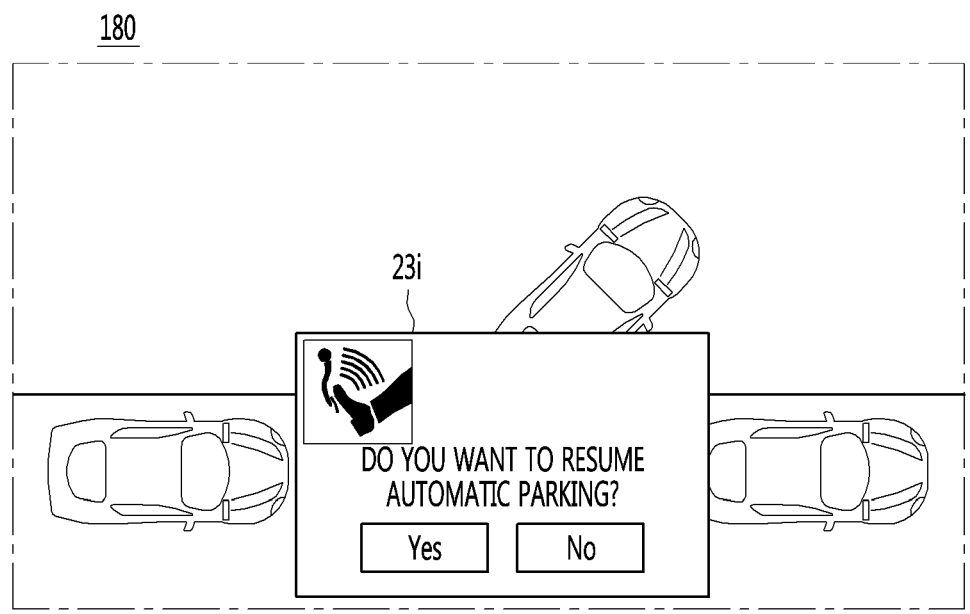
FIG. 14 is a diagram illustrating a display screen in a case where an accelerator operation value is greater than a predetermined value, according to an embodiment.

Referring to FIG. 14, when the automatic parking function is released by the accelerator operation of the user, the processor 170 may provide, through the display unit 180, a graphic image 21i indicating that an accelerator operation is input and a pop-up window 23i to allow the user to determine whether to resume the automatic parking function, in order to grasp the user's intention in a state in which the automatic parking function is released.

When the user resumes the automatic parking function, the parking assistance apparatus 100 may redesign and display a parking path P such that the vehicle is automatically parked in the target parking space T which is previously selected.

Also, the parking assistance apparatus 100 may return back to the step for sensing situations of vehicle surroundings accurately and searching for an available parking space.

On the other hand, the processor 170 may maintain the performance of the automatic parking function when the accelerator operation value of the user is equal to or less than the predetermined value (S205).

Specifically, the processor 170 may maintain automatic steering control such that the vehicle continuously follows the parking path P that is previously designed although the traveling speed of the vehicle is increased according to the accelerator operation value of the user. When the vehicle deviates from the previously-designed parking path P due to the instantaneous acceleration of the vehicle, the processor 170 may redesign a parking path P and maintain automatic steering control such that the vehicle follows the redesigned parking path P1.

Figure 15:
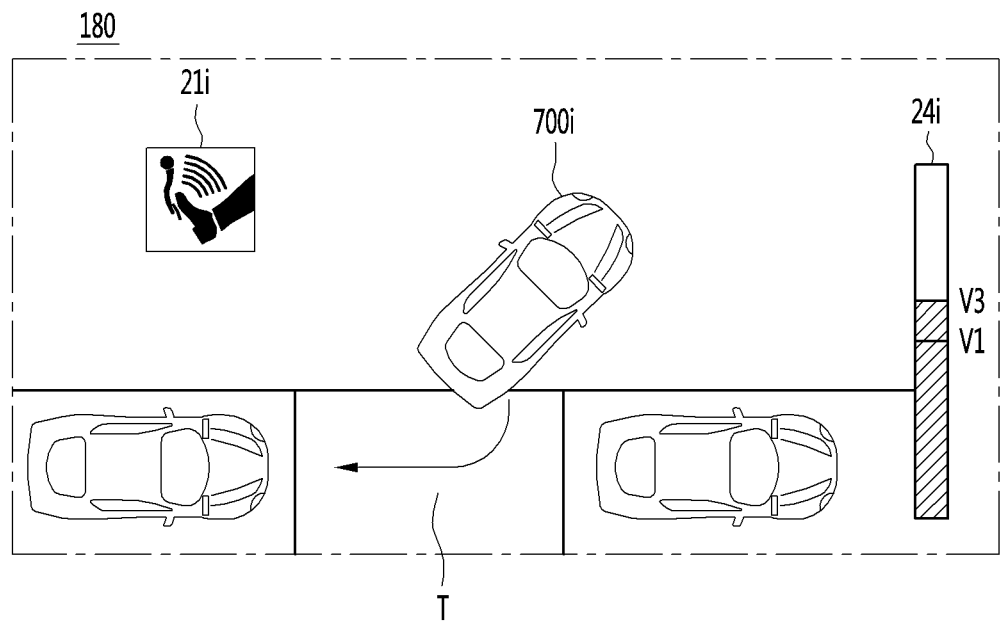
FIG. 15 is a diagram illustrating a display screen in a case where an accelerator operation value is less than a predetermined value, according to an embodiment.
Figure 16:
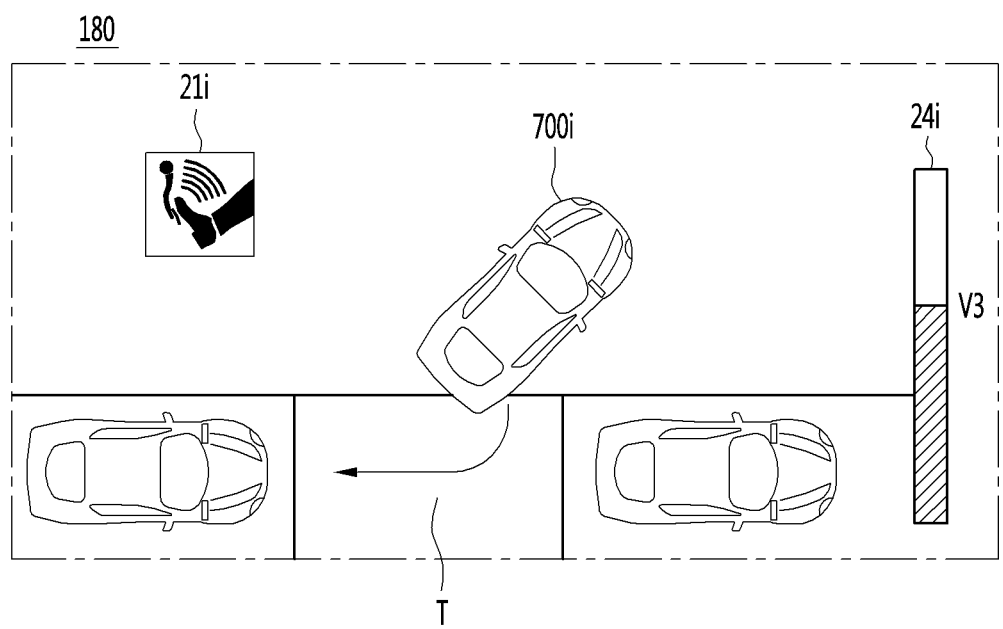
FIG. 16 is a diagram illustrating a display screen for setting a basic speed for automatic parking by reflecting an accelerator operation value of a user, according to an embodiment.

Referring to FIG. 15, the traveling speed of the vehicle for parking may be increased from the first speed (V1) (basic traveling speed) to a third speed (V3) according to the accelerator operation of the user. The processor 170 displays a graphic image indicating that there is an accelerator operation input and a graphic image indicating that the basic traveling speed (first speed V1) of the vehicle and the real-time speed (third speed V3) of the vehicle along with the vehicle surroundings image, allowing the user to know that the traveling speed of the vehicle is increased according to the accelerator operation input of the user herself or himself in real time.

The user may think that the basic traveling speed of the vehicle is low during automatic parking, and may perform an accelerator operation input. In a case where the user's intention is as described above, user inconvenience may be caused when the accelerator is finely controlled every time the automatic parking function is performed.

In the state where the traveling speed of the vehicle is increased according to the accelerator operation input, when there is a user input for setting the current traveling speed as the basic traveling speed, the parking assistance apparatus 100 may perform resetting to set the basic traveling speed of the vehicle to the current traveling speed (S206).

When the basic traveling speed is set, the parking assistance apparatus 100 may perform control such that the vehicle automatically travels at the reset basic traveling speed in future automatic parking. That is, referring to FIG. 16, when there is a user input for setting the basic traveling speed while the vehicle is being automatically parked at the third speed V3, the parking assistance apparatus 100 may display the third speed V3 as the basic traveling speed and perform control such that the vehicle is automatically parked.

On the other hand, the processor 170 may continuously correct an automatic steering control value and control the steering based on the corrected value such that the vehicle follows the parking path P although the vehicle is accelerated according to the accelerator operation input (S207).

Accordingly, the predicted parking path P displayed on the display unit 180 may be continuously displayed without being changed in spite of the accelerator operation.

When the vehicle deviates and slips from the previously-designed parking path P since the vehicle is instantaneously accelerated and correction for steering control is late, the processor 170 may redesign a parking path P, display the redesigned parking path P, and perform automatic steering control such that the vehicle follows the parking path P (S208 and S209)

Figure 17:
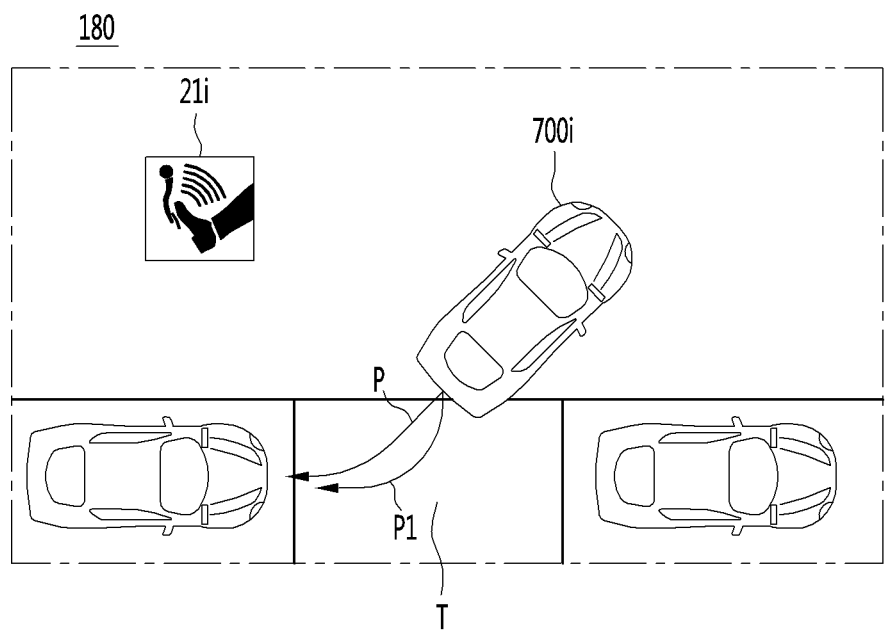
FIG. 17 is a diagram illustrating a case where a parking path is redesigned, according to an embodiment.
Figure 18:
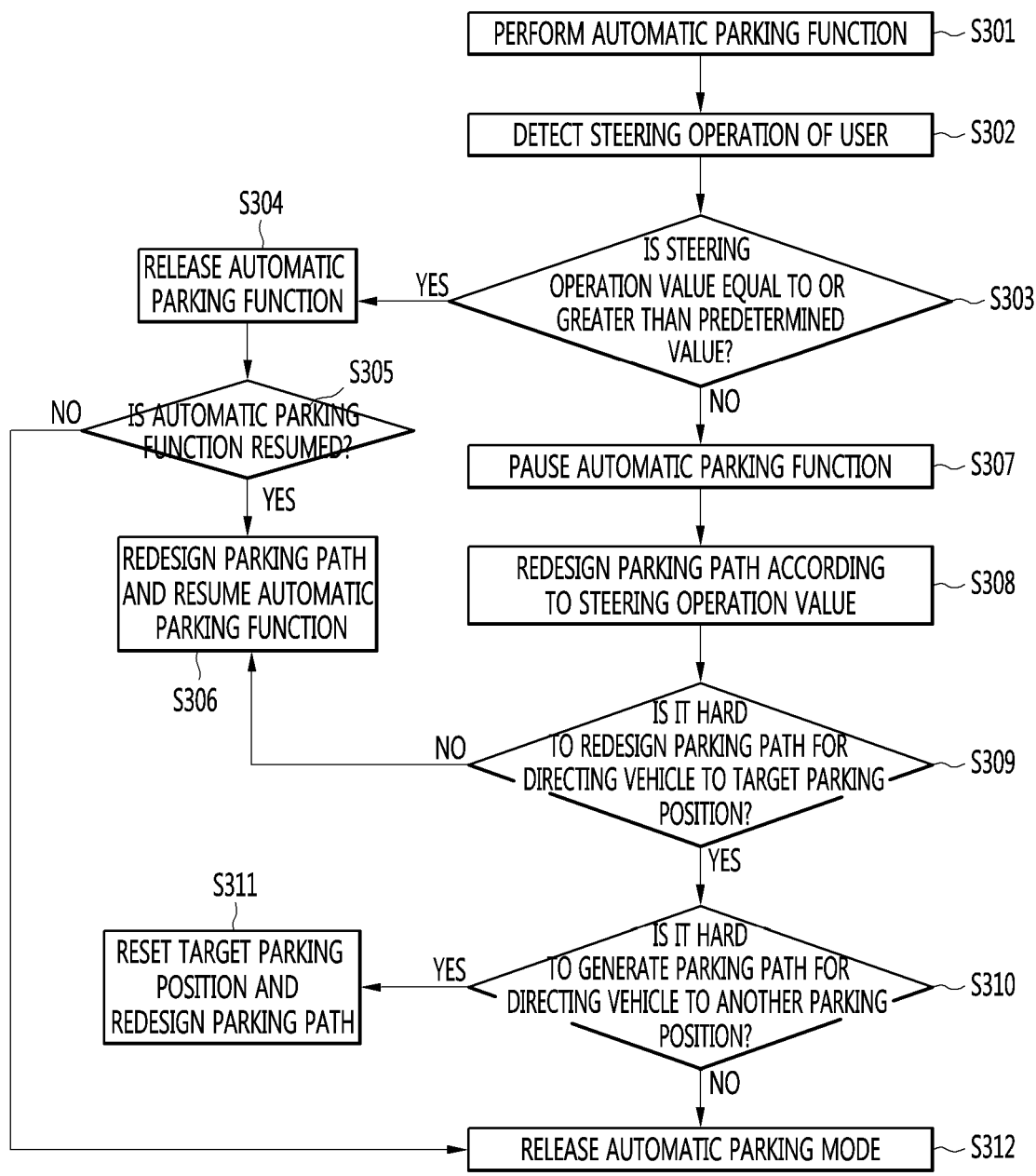
FIG. 18 is a flowchart of a method of performing an automatic parking function when there occurs intervention by a steering operation, according to an embodiment.

Specifically, referring to FIG. 17, when the vehicle deviates from the predicted parking path P due to instantaneous acceleration, the processor 170 redesigns a parking path P1 for directing the vehicle to the target parking space T from the deviated position and performs steering control such that the vehicle follows the redesigned parking path P1. Therefore, the predicted parking path P which had been displayed on the display unit 180 is changed to the redesigned parking path P1, which is then displayed.

On the other hand, when the vehicle deviates from the predicted parking path P by a predetermined distance or more, the parking assistance apparatus 100 may determine that the user's intention is to release the automatic parking function and release the automatic parking function.

That is, the parking assistance apparatus 100 analyzes the degree of the accelerator operation and an acceleration amount resulting from the accelerator operation to grasp the intention of the user and effectively controls the automatic parking function according to the grasped intention, thus enhancing user convenience and achieving safe parking of the vehicle.

Next, a method of performing the automatic parking function in the parking assistance apparatus 100 when a steering operation is input during performance of the automatic parking function will be described in detail below with reference to FIGS. 18 to 23.

First, the parking assistance apparatus 100 may perform an automatic parking function (S301).

Specifically, the parking assistance apparatus 100 may initiate an automatic parking mode when a vehicle arrives at a destination or in response to a user input.

When the automatic parking mode is initiated, the sensor unit 155 of the parking assistance apparatus 100 senses vehicle surroundings and searches for an available parking space. In this case, the processor 170 may perform control such that the display unit 180 generates an around view image by converting an image generated by photographing the vehicle surroundings into a top view image and displays the generated around view image.

Specifically, in an embodiment, the sensor unit 155 includes an around view monitoring camera and the processor 170 may detect an available parking space in such a way to detect an empty space with a predetermined size or more from the around view image photographed by the around view monitoring camera. More specifically, the processor 170 detects a parking lane from the around view image and when an object other than pavement (background) is not detected within the parking lane, detects a corresponding space as the available parking space.

Also, the sensor unit 155 may include a distance sensor, and may measure a distance to an object in at least one side direction of the vehicle during movement of the vehicle and detect an empty space with a predetermined size or more in which no object exists, as an available parking space.

When at least one available parking space is detected, the parking assistance apparatus 100 sets an available parking space selected by a user input or an available parking space automatically selected by a predetermined condition as the target parking space T.

For example, when a plurality of available parking spaces are detected, the processor 170 may evaluate the available parking spaces according to at least one criterion and automatically set the highest-evaluated available parking space as the target parking space T. Specifically, the processor 170 may automatically set an available parking space located closest from an entrance of a destination as the target parking space T. Also, the processor 170 may automatically set an available parking space located closest from a current position of the vehicle as the target parking space T.

When the the target parking space T is set, the parking assistance apparatus 100 may design a parking path P for directing the vehicle to the available parking space.

The parking assistance apparatus 100 may perform control such that the vehicle follows the parking path P. Specifically, in order to allow the vehicle to follow the parking path P, the processor 170 determines a traveling speed of the vehicle, a wheel direction (or steering control value) with respect to each position of the vehicle, a gear change value, or the like, generates a driving-unit control signal, and transmits the generated driving-unit control signal, thus allowing the vehicle to automatically travel along the parking path P.

Although it is described that the parking assistance apparatus 100 determines a basic traveling speed of the vehicle as a creeping speed and automatically controls a steering based on the creeping speed to allow the vehicle to follow the parking path P, embodiments are not limited thereto. That is, the basic traveling speed may be changed by user settings.

When the vehicle is following a path according to automatic control, the user may perform a steering operation input. In this case, the steering operation input may mean an input for controlling a steering driving unit so as to control wheels of the vehicle.

Specifically, the user can perform the steering operation input by rotating a steering or by using a remote terminal.

The processor 170 may receive steering operation input information of the user through the interface unit 130 or the communication unit 120 (S302).

Furthermore, when receiving the steering operation input information of the user, the processor 170 may analyze the degree of the steering operation and detect a user's intention for the steering operation (203). That is, the processor 170 may determine whether to resume the automatic parking function depending on the degree of the steering operation of the user.

Figure 19:
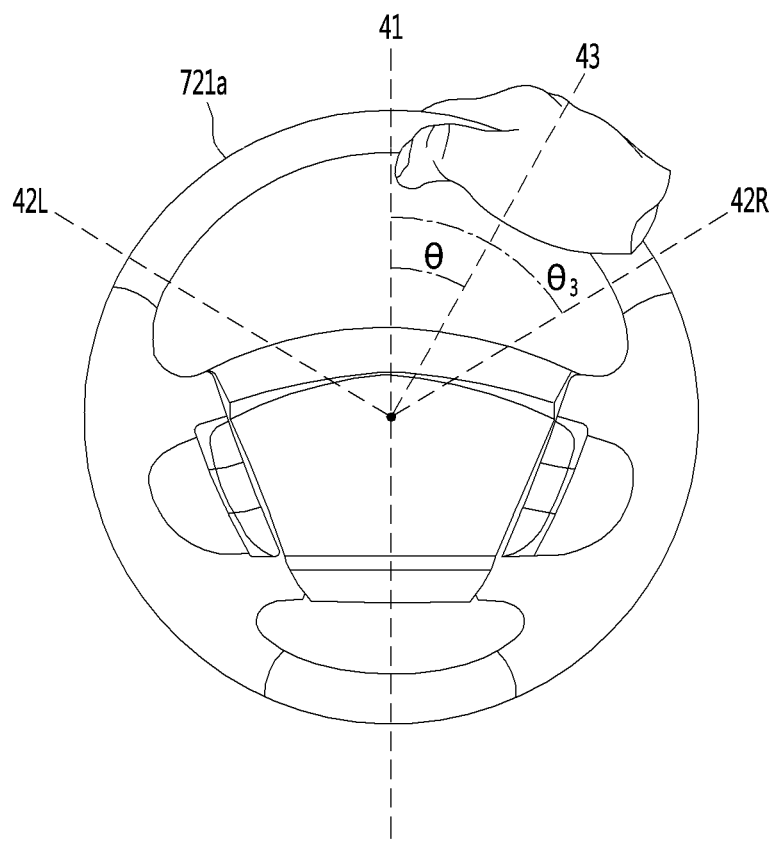
FIG. 19 is a diagram for describing criteria for determining a degree of a steering operation of a user according to an embodiment.

Specifically, referring to FIG. 19, when the user performs the steering operation input by rotating the steering 721a, the processor 170 may determine the user's intention differently depending on whether the steering 721a is rotated beyond a third angle θ3 with respect to a position 41 of the steering 721a that is planned when the steering operation input is not performed and control the automatic parking function in different manners.

Specifically, when the position 43 of the steering 721a is rotated to a position 42R or 42L beyond the third angle θ3 since the user rotates the steering 721a, the processor 170 may determine that the intention of the user is to release the automatic parking function of the vehicle and switch to a manual driving mode, and release the automatic parking mode.

On the other hand, when the steering 721a is rotated right or left within the third angle θ3, the processor 170 may determine that the intention of the user is to change the parking path of the vehicle, redesign a parking path P of the vehicle by reflecting a steering operation value θ of the user, and perform control such that the vehicle follows the redesigned parking path P.

Also, the processor 170 may determine the user's intention by comparing a path through which the vehicle has moved according to the steering operation by the user with an existing parking path P.

For example, the processor 170 may not release the automatic parking mode when it is possible to design the predicted parking path P for directing the vehicle to an existing target parking space T from a position of the vehicle that deviates from the parking path P due to the steering operation. When it is difficult to design the parking path P from a position of the vehicle that deviates from the parking path P, the processor 170 may release the automatic parking mode. A case where the processor 170 is difficult to design the parking path P again may mean a case where it is necessary to design a path due to an increase in the number of gear changes.

That is, the processor 170 may analyze the degree of the steering operation of the user and when the degree of the steering operation is greater than a predetermined value, release the automatic parking function (S304).

Figure 20:
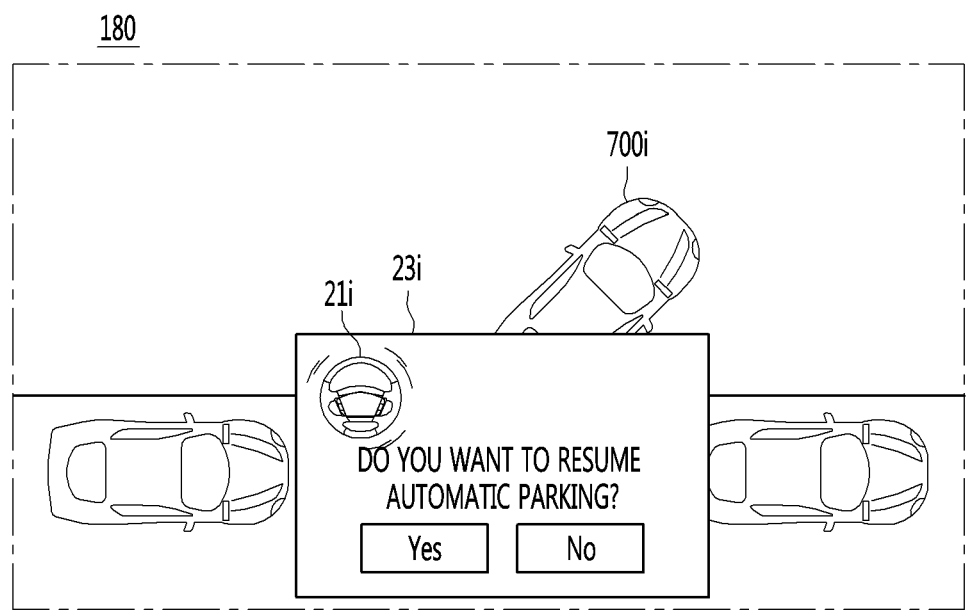
FIG. 20 is a diagram illustrating a display screen in a case where a steering operation value is greater than a predetermined value, according to an embodiment.

Referring to FIG. 20, when the automatic parking function is released by the steering operation of the user, the processor 170 may display a graphic image 21i indicating that a steering operation input is performed and a pop-up window 23i to allow a user to select whether to resume the automatic parking function on the display unit 180 in a state in which the automatic parking function is released (S305).

When the user resumes the automatic parking function, the parking assistance apparatus 100 may redesign a parking path P such that the vehicle is automatically parked in the target parking space T which is previously selected and display the parking path P. In this case, the parking path P redesigned by the parking assistance apparatus 100 may have a larger number of gear changes than that in the existing parking path P (S306).

Figure 21:
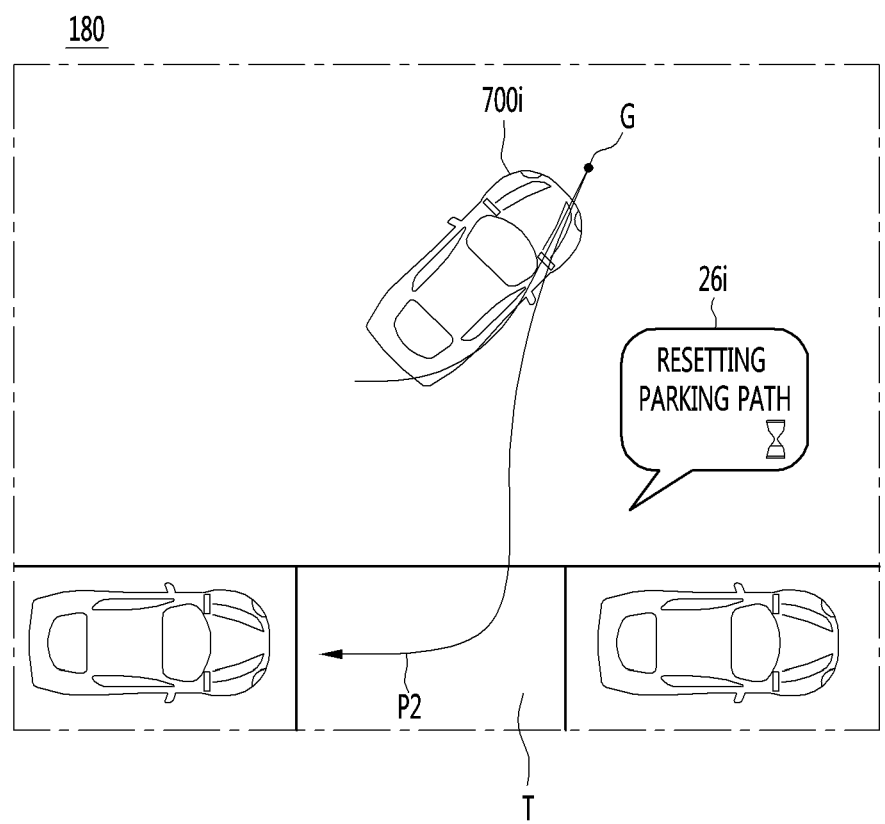
FIG. 21 is a diagram illustrating a display screen in a case where a parking path is redesigned, according to an embodiment.

Referring to FIG. 21, the processor 170 may redesign the parking path P with the increased number of gear changes G so as to direct the vehicle from a position of the vehicle moved due to the steering control of the user to the previously-set target parking space T.

On the other hand, the processor 170 may maintain the performance of the automatic parking function when a steering operation value of the user is equal to or less than a predetermined value.

In this case, the processor 170 may pause the automatic parking function during input of the steering operation (S307). Specifically, the processor 170 may temporarily stop the vehicle while maintaining the automatic parking mode, not release the automatic parking mode.

That is, the processor 170 may stop the vehicle, redesign a parking path P based on the steering operation, and display the redesigned parking path P through the display unit 180.

However, embodiments are not limited thereto. The parking assistance apparatus 100 may perform control such that the vehicle travels at a basic traveling speed of the vehicle although there is the steering operation and continuously redesign the parking path P for directing the vehicle to the target parking space T according to the steering operation in real time.

That is, the processor 170 may allow the vehicle to temporarily stop and then travel and redesign the parking path P by reflecting the steering operation (S308). The processor 170 may perform control such that the display unit 180 displays the parking path P redesigned according to the steering operation so as to allow a driver to check the parking path P redesigned according to the steering operation.

Specifically, when there is a steering operation for rotating the steering of the vehicle to the right, the processor 170 may redesign the parking path P for directing the vehicle to the right slightly and then to the target parking space T.

Figure 22:
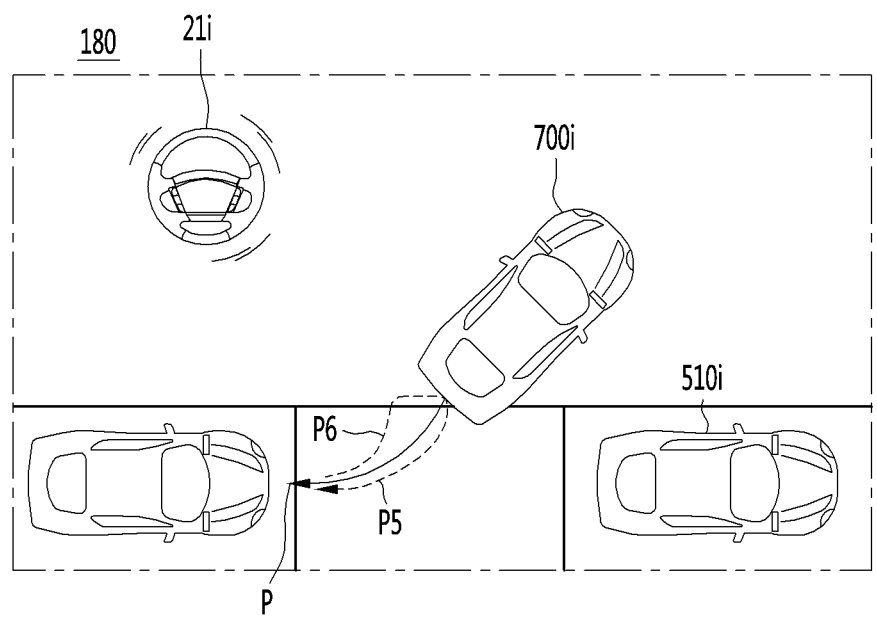
FIG. 22 is a diagram illustrating a display screen displaying a case where a parking path is changed according to a steering operation, according to an embodiment.

More specifically, referring to FIG. 22, when there is a steering operation for rotating the steering of the vehicle to the left, the processor 170 may design a sixth parking path P6 for directing the vehicle to the left than a position in an existing parking path P and then to the target parking space T. Similarly, when there is a steering operation for rotating the steering of the vehicle to the right, the processor 170 may redesign a fifth parking path P for directing the vehicle to the right than the position in the existing parking path P and then to the target parking space T.

On the other hand, when it is difficult to design the parking path P from a position of the vehicle that deviates from the parking path P since the vehicle has moved during the steering operation of the user, the processor 170 may release the automatic parking mode. A case where the processor 170 is difficult to design the parking path P again may mean a case where it is necessary to design a parking path with an increased number of gear changes (S310 and S312).

When it is possible to generate a parking path P for directing the vehicle to another available parking space from a position at which the vehicle deviates from the parking path P, the processor 170 may reset the another available parking space T as the target parking space T and design a parking path P for directing the vehicle to the set target parking space T (S311).

Figure 23:
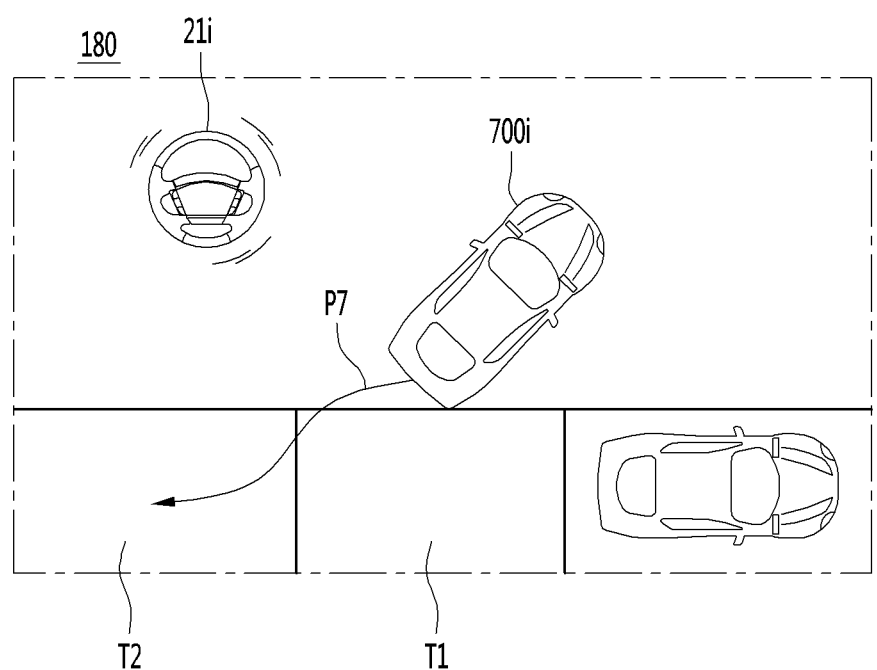
FIG. 23 is a diagram illustrating a display screen displaying a case where a target parking position is changed according to a steering operation, according to an embodiment.

Specifically, referring to FIG. 23, in a case where it is difficult to design a parking path P for directing the vehicle to the first parking space T1 and it is possible to design a parking path P7 for directing the vehicle to a second parking space T2 when a steering operation value by the user is reflected in a state in which the first parking space T1 is the target parking space T, the processor 170 resets the second parking space T2 as the target parking space and designs a seventh parking path P for directing the vehicle to the second parking space T2.

That is, the parking assistance apparatus 100 analyzes the degree of the steering operation and a change in position of the vehicle due to the steering operation to grasp the intention of the user and effectively controls the automatic parking function according to the grasped intention, thus enhancing user convenience and achieving safe parking of the vehicle.

On the other hand, the brake operation input, the accelerator operation input, or the steering operation input may be performed through a mobile terminal in a remote control manner.

Specifically, the mobile terminal 600 may include a terminal communication unit, a terminal display unit, and a terminal input unit and may provide a graphic user interface for allowing the user to control the automatic parking function of the vehicle in a remote control manner. In this case, a description for the terminal communication unit quotes the description of the display unit 180 of the vehicle and a description for the terminal input unit quotes the description of the input unit of the vehicle.

In an embodiment, the mobile terminal 600 may provide a graphic user interface to the user through a touch screen in which the terminal display unit and the terminal input unit are combined to each other.

Figure 24:
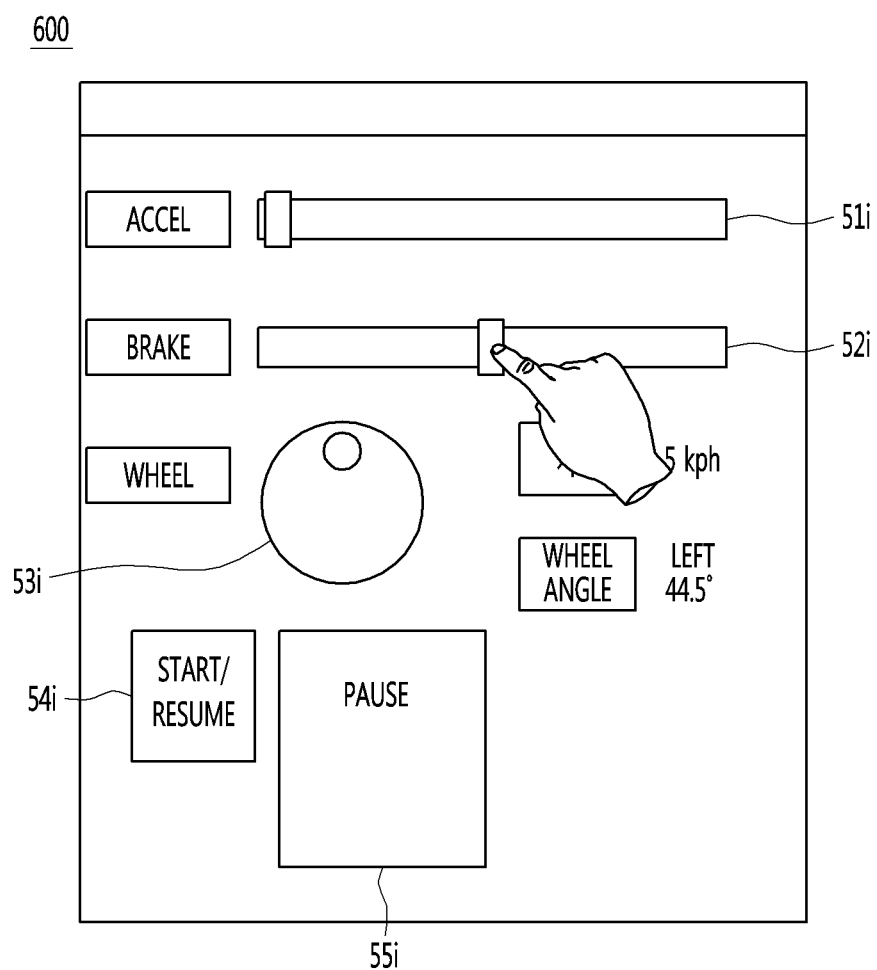
FIGS. 24 to 26 are diagrams illustrating various examples of a graphic user interface of a terminal for controlling automatic parking in a remote control manner, according to an embodiment.

Specifically, referring to FIG. 24, on the touch screen of the mobile terminal 600, a first icon 51i for controlling an accelerator, a second icon 52i for controlling a brake, a third icon 53i for controlling a steering, a fourth icon 54i for inputting an automatic parking function pause/resume, and a fifth icon 55i for releasing the automatic parking function may be displayed. The user may perform the brake operation input, the accelerator operation input, or the steering operation input by touching/touching and dragging the first to fifth icons 51i to 55i.

In this case, the the first to fifth icons 51i to 55i are provided in a draggable bar shape, thus allowing the user to input a brake operation value or an accelerator operation value.

Furthermore, when the mobile terminal 600 transmits a user input from the user to the vehicle through the terminal communication unit, as described above, the vehicle may perform the automatic parking function while reflecting the user input.

Figure 25:
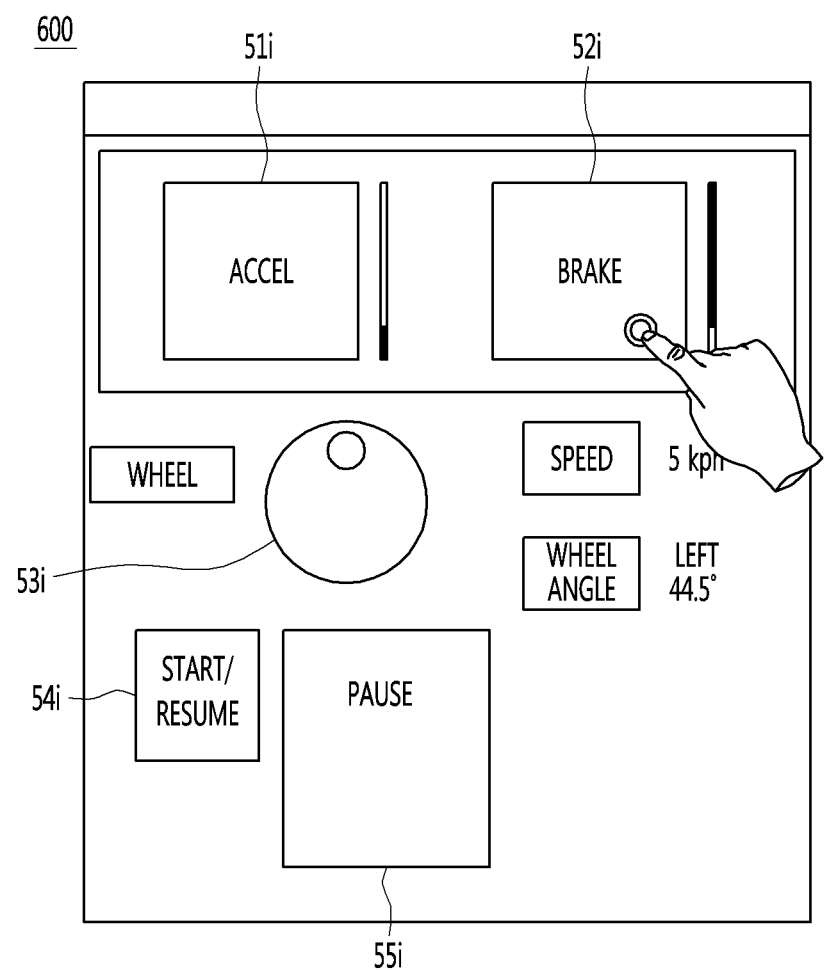

In another embodiment, referring to FIG. 25, on the touch screen of the mobile terminal 600, a first icon 51i for controlling an accelerator, a second icon 52i for controlling a brake, a third icon 53i for controlling a steering, a fourth icon 54i for inputting an automatic parking function pause/resume, and a fifth icon 55i for releasing the automatic parking function may be displayed. The user may perform the brake operation input, the accelerator operation input, or the steering operation input by touching/touching and dragging the first to fifth icons 51i to 55i.

In this case, the first icon 51i and the second icon 52i may be displayed as a simple touch button. On the first icon 51i and the second icon 52i, a user input value may be recognized differently depending on a force of a touch by a user. For example, a brake operation value may be increased in proportion to a touch force on the first icon 51i which the user touches. Similarly, an accelerator operation value may be increased in proportion to a touch force on the second icon 52i which the user touches.

The mobile terminal may provide a screen for displaying a bar indicating an operation value inputted depending on the force of an operation so as to allow a user to check the value inputted by the user herself or himself.

As described above, the mobile terminal 600 according to another embodiment may provide a graphic user interface for allowing the user to intuitively and easily control the vehicle in a remote control manner.

Figure 26:
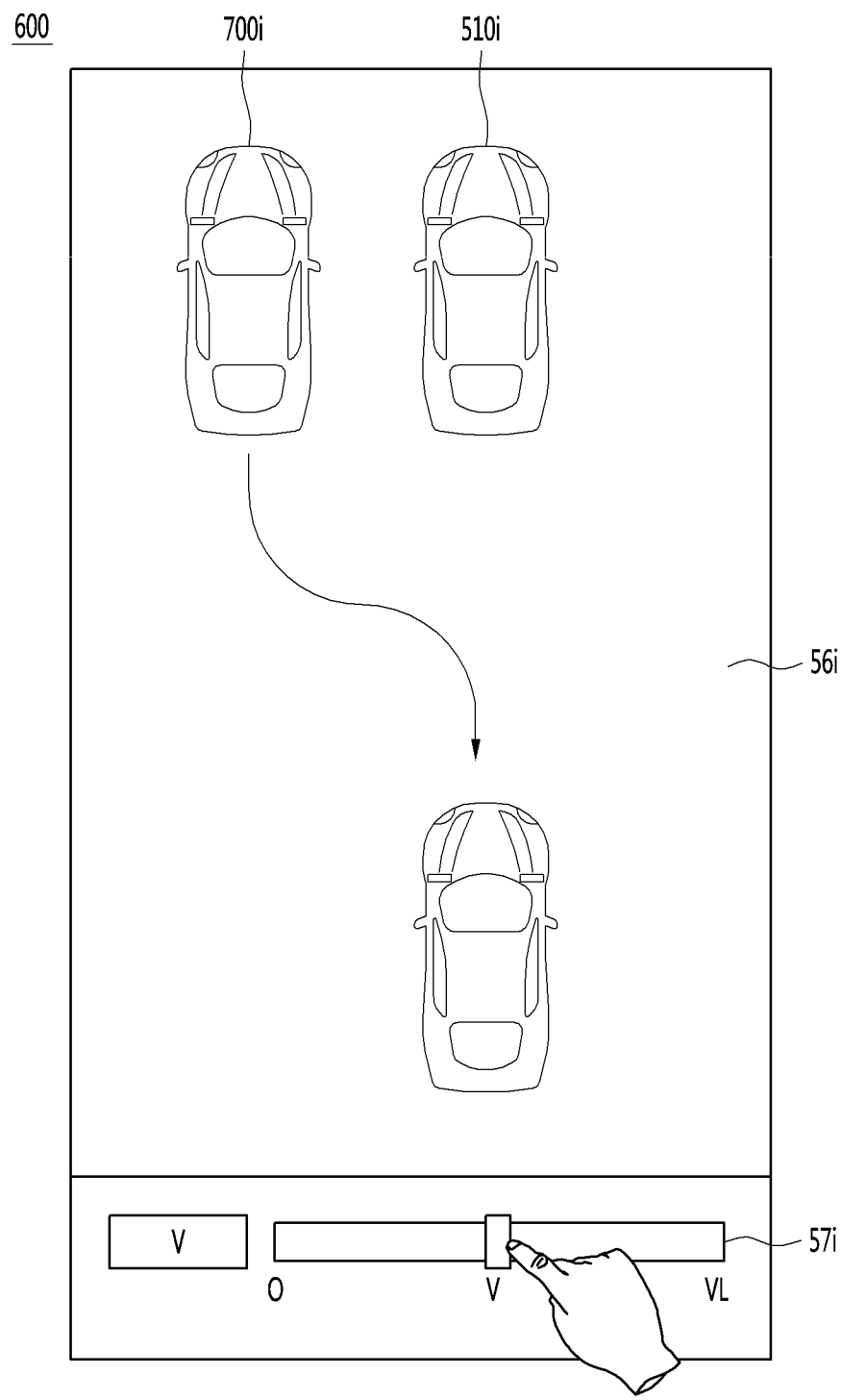

Referring to FIG. 26, according to another embodiment, the mobile terminal 600 may provide a touch screen which displays a seventh icon for setting a speed of the vehicle and whether to pause the automatic parking function and an around view monitoring image 56i obtained by photographing surroundings of the vehicle.

Specifically, the seventh icon 57i is provided in the shape of a bar for adjusting a speed. When the user is touching bar, the automatic parking function may be performed and when the user touches the bar, the the automatic parking function may be stopped.

Furthermore, the user may make an input to decrease a traveling speed of the vehicle by touching the bar and moving the bar to one side, which may be a brake operation input.

On the other hand, the user may make an input to increase the traveling speed of the vehicle by touching the bar and moving the bar to the other side, which may be an acceleration operation input.

As described above, the mobile terminal 600 according to another embodiment may provide a graphic user interface for allowing the user to intuitively and easily control the vehicle in a remote control manner.

Figure 27:
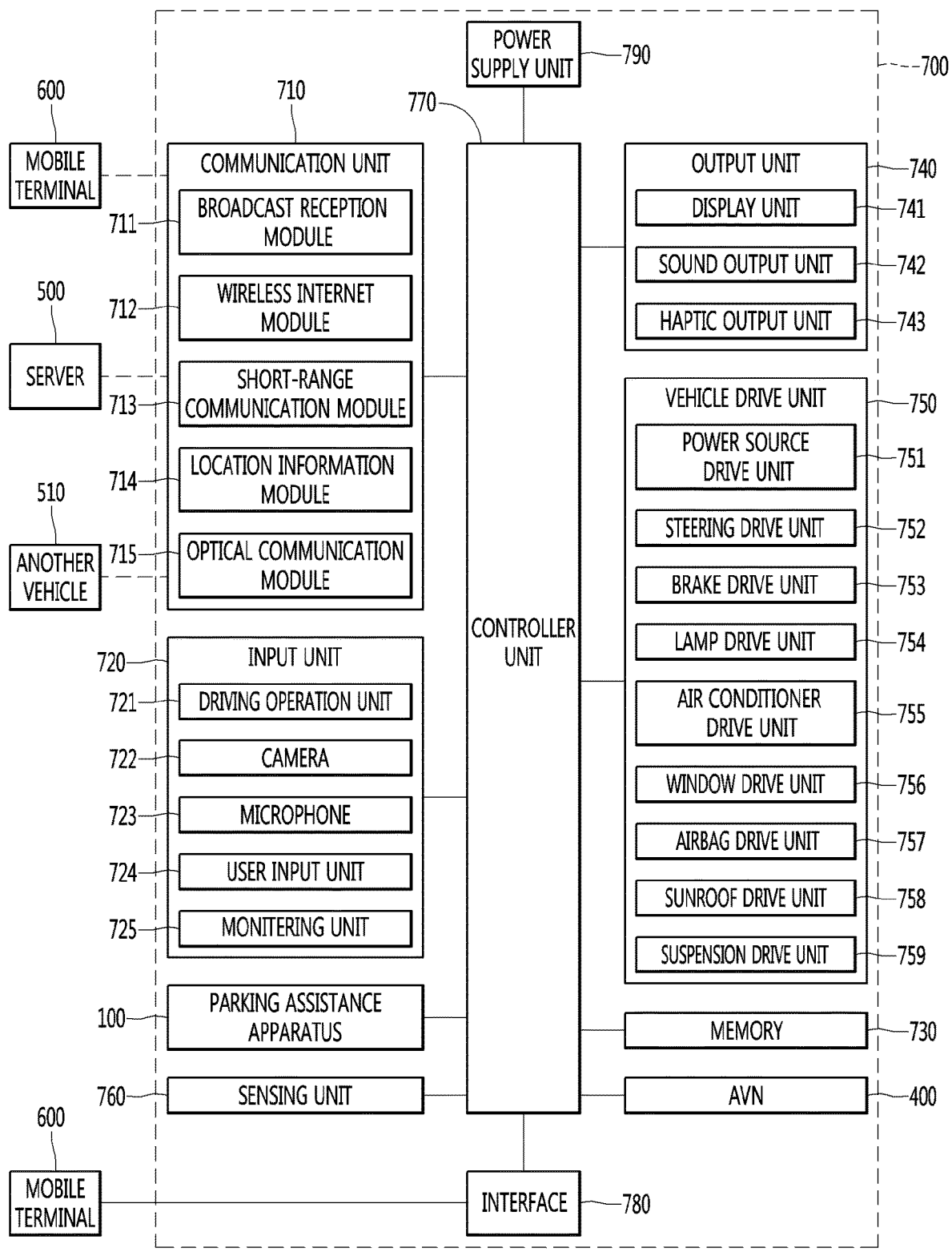
FIG. 27 is a block diagram showing the internal configuration of the vehicle having the parking assistance apparatus shown in FIG. 1.

Referring to the FIG. 27, the above-described parking assistance apparatus 100 may be included in the vehicle 700.

The vehicle 700 may include a communication unit 710, an input unit 720, a sensing unit 760, an output unit 740, a vehicle drive unit 750, a memory 730, an interface 780, a controller 770, a power supply unit 790, a parking assistance apparatus 100 and AVN apparatus 400. Here, among the units included in the parking assistance apparatus 100 and the units of the vehicle 700, the units having the same names are described as being included in the vehicle 700.

The communication unit 710 may include one or more modules which permit communication such as wireless communication between the vehicle and the mobile terminal 600, between the vehicle and the external server 50 or between the vehicle and the other vehicle 510. Further, the communication unit 710 may include one or more modules which connect the vehicle to one or more networks.

The communication unit 710 includes a broadcast reception module 711, a wireless Internet module 712, a short-range communication module 713, and an optical communication module 715.

The broadcast reception module 711 receives a broadcast signal or broadcast related information from an external broadcast management server through a broadcast channel. Here, the broadcast includes a radio broadcast or a TV broadcast.

The wireless Internet module 712 refers to a wireless Internet access module and may be provided inside or outside the vehicle. The wireless Internet module 712 transmits and receives a wireless signal through a communication network according to wireless Internet access technologies.

Examples of such wireless Internet access technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 712 may transmit/receive data according to one or more of such wireless Internet technologies, and other Internet technologies as well. For example, the wireless Internet module 712 may wirelessly exchange data with the external server 500. The wireless Internet module 712 may receive weather information and road traffic state information (e.g., transport protocol experts group (TPEG) information) from the external server 500.

The short-range communication module 713 is configured to facilitate short-range communication. Such short-range communication may be supported using at least one of Bluetooth™, Radio Frequency Identification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

The short-range communication module 713 may form a wireless local area network to perform short-range communication between the vehicle and at least one external device. For example, the short-range communication module 713 may wirelessly exchange data with the mobile terminal 600. The short-range communication module 713 may receive weather information and road traffic state information (e.g., transport protocol experts group (TPEG) information) from the mobile terminal 600. When a user rides in the vehicle, the mobile terminal 600 of the user and the vehicle may pair with each other automatically or by executing the application of the user.

A location information module 714 acquires the location of the vehicle and a representative example thereof includes a global positioning system (GPS) module. For example, the vehicle may acquire the location of the vehicle using a signal received from a GPS satellite upon utilizing the GPS module.

The optical communication module 715 may include a light emitting unit and a light reception unit.

The light reception unit may convert a light signal into an electric signal and receive information. The light reception unit may include a photodiode (PD) for receiving light. The photodiode may covert light into an electric signal. For example, the light reception unit may receive information on a preceding vehicle through light emitted from a light source included in the preceding vehicle.

The light emitting unit may include at least one light emitting element for converting electrical signals into a light signal. Here, the light emitting element may be a Light Emitting Diode (LED). The light emitting unit converts electrical signals into light signals to emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle. For example, the light emitting unit may be at least one selected from among a headlight, a taillight, a brake light, a turn signal, and a sidelight. For example, the optical communication module 715 may exchange data with the other vehicle 510 via optical communication.

The input unit 720 may include a driving operation unit 721, a camera 195, a microphone 723 and a user input unit 724.

Figure 4:
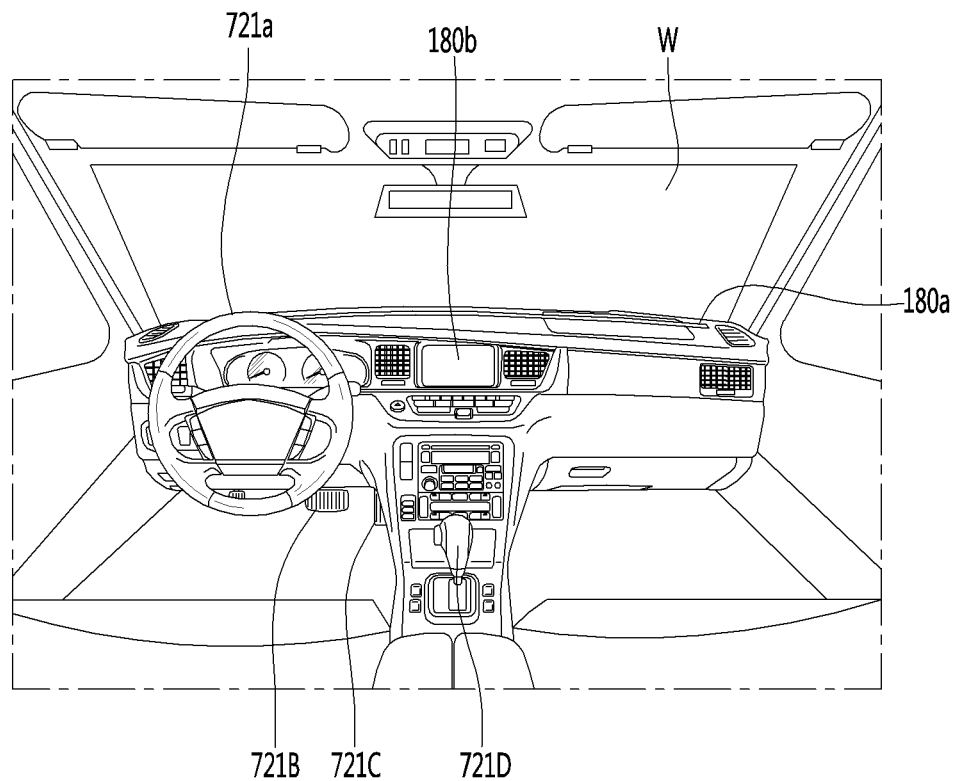
FIG. 4 is a diagram showing the inside of a vehicle having a parking assistance apparatus according to an embodiment of the present invention.

The driving operation unit 721 receives user input for driving of the vehicle (see FIG. 4). The driving operation unit 721 may include a steering input unit 721A, a shift input unit 721D, an acceleration input unit 721C and a brake input unit 721B.

The steering input unit 721A is configured to receive user input with regard to the direction of travel of the vehicle. The steering input unit 721A may include a steering wheel using rotation. In some embodiments, the steering input unit 721A may be configured as a touchscreen, a touch pad, or a button.

The shift input unit 721D is configured to receive input for selecting one of Park (P), Drive (D), Neutral (N), and Reverse (R) gears of the vehicle from the user. The shift input unit 721D may have a lever form. In some embodiments, the shift input unit 721D may be configured as a touchscreen, a touch pad, or a button.

The acceleration input unit 721C is configured to receive input for acceleration of the vehicle from the user. The brake input unit 721B is configured to receive input for speed reduction of the vehicle from the user. Each of the acceleration input unit 721C and the brake input unit 721B may have a pedal form. In some embodiments, the acceleration input unit 721C or the brake input unit 721B may be configured as a touchscreen, a touch pad, or a button.

The camera 722 may include an image sensor and an image processing module. The camera 722 may process a still image or a moving image obtained by the image sensor (e.g., CMOS or CCD). In addition, the image processing module processes the still image or the moving image acquired through the image sensor, extracts necessary information, and delivers the extracted information to the controller 770. The vehicle may include the camera 722 for capturing the front image of the vehicle or the image of the vicinity of the vehicle and the monitoring unit 725 for capturing the image of the space inside the vehicle.

The monitoring unit 725 may acquire an image of a passenger. The monitoring unit 725 may acquire an image for biometric information of the passenger.

Although the monitoring unit 725 and the camera 722 are included in the input unit 720 in FIG. 27, the camera 722 may be included in the parking assistance apparatus 100 as described above.

The microphone 723 may process external sound signals into electrical data. The processed data may be utilized in various ways according to a function that the vehicle is performing. The microphone 723 may convert a user voice command into electrical data. The converted electrical data may be transmitted to the controller 770.

Meanwhile, in some embodiments, a camera 722 or the microphone 723 may not be included in the input unit 720 but may be included in the sensing unit 760.

The user input unit 724 is configured to receive information from the user. When information is input via the user input unit 724, the controller 770 may control the operation of the vehicle to correspond to the input information. The user input unit 724 may include a touch input unit or a mechanical input unit. In some embodiments, the user input unit 724 may be located in a region of the steering wheel. In this case, the driver may operate the user input unit 724 with the fingers while gripping the steering wheel.

The sensing unit 760 is configured to sense signals associated with, for example, signals related to driving of the vehicle. To this end, the sensing unit 760 may include a collision sensor, a wheel sensor, a speed sensor, tilt sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, a radar, a Lidar, etc.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric sensor. The biometric sensor senses and acquires biometric information of the passenger. The biometric information may include fingerprint information, iris-scan information, retina-scan information, hand geometry information, facial recognition information, and voice recognition information. The biometric sensor may include a sensor for sensing biometric information of the passenger. Here, the monitoring unit 725 and the microphone 723 may operate as a sensor. The biometric sensor may acquire hand geometry information and facial recognition information through the monitoring unit 725.

The output unit 740 is configured to output information processed by the controller 770. The output unit 740 may include a display unit 741, a sound output unit 742, and a haptic output unit 743.

The display unit 741 may display information processed by the controller 770. For example, the display unit 741 may display vehicle associated information. Here, the vehicle associated information may include vehicle control information for direct control of the vehicle or driver assistance information for aiding in driving of the vehicle. In addition, the vehicle associated information may include vehicle state information that indicates the current state of the vehicle or vehicle traveling information regarding traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle and the user and also function to provide an output interface between the vehicle and the user. In this case, the display unit 741 may include a touch sensor which senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some embodiments, the display unit 741 may be implemented as a head up display (HUD). When the display unit 741 is implemented as a HUD, information may be output via a transparent display provided at the windshield. Alternatively, the display unit 741 may include a projector module to output information via an image projected onto the windshield.

The sound output unit 742 is configured to convert electrical signals from the processor 170 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control of a power source inside the vehicle.

For example, in the case where a fossil fuel based engine (not illustrated) is a power source, the power source drive unit 751 may perform electronic control of the engine. As such, the power source drive unit 751 may control, for example, an output torque of the engine. In the case where the power source drive unit 751 is an engine, the power source drive unit 751 may control the speed of the vehicle by controlling the output torque of the engine under the control of the controller 770.

In another example, in the case where an electric motor (not illustrated) is a power source, the power source drive unit 751 may perform control of the motor. As such, the power source drive unit 751 may control, for example, the RPM and torque of the motor.

The steering drive unit 752 may perform electronic control of a steering apparatus inside the vehicle. The steering drive unit 752 may change the direction of travel of the vehicle.

The brake drive unit 753 may perform electronic control of a brake apparatus (not illustrated) inside the vehicle. For example, the brake drive unit 753 may reduce the speed of the vehicle by controlling the operation of brakes located at wheels. In another example, the brake drive unit 753 may adjust the direction of travel of the vehicle leftward or rightward by differentiating the operation of respective brakes located at left and right wheels.

The lamp drive unit 754 may turn at least one lamp arranged inside and outside the vehicle on or off. In addition, the lamp drive unit 754 may control, for example, the intensity and direction of light of each lamp. For example, the lamp drive unit 754 may perform control of a turn signal lamp or a brake lamp.

The air conditioner drive unit 755 may perform electronic control of an air conditioner (not illustrated) inside the vehicle. For example, when the interior temperature of the vehicle is high, the air conditioner drive unit 755 may operate the air conditioner to supply cold air to the interior of the vehicle.

The window drive unit 756 may perform electronic control of a window apparatus inside the vehicle. For example, the window drive unit 756 may control opening or closing of left and right windows of the vehicle.

The airbag drive unit 757 may perform the electronic control of an airbag apparatus inside the vehicle. For example, the airbag drive unit 757 may control an airbag to be deployed in a dangerous situation.

The sunroof drive unit 758 may perform electronic control of a sunroof apparatus (not illustrated) inside the vehicle. For example, the sunroof drive unit 758 may control opening or closing of a sunroof.

The suspension drive unit 759 may perform electronic control of a suspension apparatus (not shown) inside the vehicle. For example, when a road surface is uneven, the suspension drive unit 759 may control the suspension apparatus to reduce vibrations of the vehicle.

The memory 730 is electrically connected to the controller 770. The memory 730 may store basic data of the unit, control data for operation control of the unit and input/output data. The memory 730 may be various storage apparatuses, which are implemented in a hardware manner, such as a ROM, RAM, EPROM, flash drive and hard drive. The memory 730 may store a variety of data for overall operation of the vehicle, such as a program for processing or control of the controller 770.

The interface 780 may serve as a passage for various kinds of external devices that are connected to the vehicle. For example, the interface 780 may have a port that is connectable to the mobile terminal 600 and may be connected to the mobile terminal 600 via the port. In this case, the interface 780 may exchange data with the mobile terminal 600.

The interface 780 may serve as a passage for providing electric energy to the connected mobile terminal 600. When the mobile terminal 600 is electrically connected to the interface 780, the interface 780 may provide electric energy supplied from the power supply unit 790 to the mobile terminal 600 under control of the controller 770.

The controller 770 may control the overall operation of each unit inside the vehicle. The controller 770 may be referred to as an Electronic Control Unit (ECU).

The controller 770 may perform a function corresponding to the delivered signal according to delivery of a signal for executing the parking assistance apparatus 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The controller 770 may perform the role of the above-described processor 170. That is, the processor 170 of the parking assistance apparatus 100 may be directly set in the controller 770 of the vehicle. In such an embodiment, the parking assistance apparatus 100 may be understood as a combination of some components of the vehicle.

Alternatively, the controller 770 may control the components to transmit information requested by the processor 170.

The power supply unit 790 may supply power required to operate the respective components under the control of the controller 770. In particular, the power supply unit 790 may receive power from, for example, a battery (not illustrated) inside the vehicle.

The AVN apparatus 400 may exchange data with the controller 770. The controller 770 may receive navigation information from the AVN apparatus or a separate navigation apparatus. Here, the navigation information may include destination information, information on a route to the destination, map information related to vehicle traveling and current position information of the vehicle.

The above described features, configurations, effects, and the like are included in at least one of the embodiments of the present invention, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as including in the scope and spirit of the invention as disclosed in the accompanying claims.

Further, although the embodiments have been mainly described until now, they are just exemplary and do not limit the present invention. Thus, those skilled in the art to which the present invention pertains will know that various modifications and applications which have not been exemplified may be carried out within a range which does not deviate from the essential characteristics of the embodiments. For instance, the constituent elements described in detail in the exemplary embodiments can be modified to be carried out. Further, the differences related to such modifications and applications shall be construed to be included in the scope of the present invention specified in the attached claims.

What is claimed is:

1. A parking assistance apparatus, comprising:
   at least one sensor configured to sense vehicle surroundings;
   an interface configured to receive at least one of brake operation input information, accelerator operation input information, or steering operation input information;
   a display configured to display a graphic image for an automatic parking function; and
   at least one processor configured to:
      determine a first target parking space based on information about the vehicle surroundings sensed by the at least one sensor;
      determine a first parking path that directs a vehicle to the first target parking space; and
      perform the automatic parking function by controlling the vehicle according to a first control manner to follow the first parking path,
   wherein the at least one processor is configured to, based on an operation input of a user being detected in information received through the interface:
      based on the operation input satisfying a first condition, perform the automatic parking function according to a second control manner, different from the first control manner, that accounts for the operation input of the user; and
      based on the operation input satisfying a second condition, disengage the automatic parking function,
   wherein the detected operation input of the user is a brake operation input indicated in the brake operation input information received through the interface, and
   wherein the at least one processor is configured to, based on a brake operation value indicated in the brake operation input information exceeding a threshold value, pause the automatic parking function.

2. The parking assistance apparatus of claim 1, wherein:
   the brake operation input satisfying the second condition comprises a duration of the brake operation input exceeding a threshold duration of time, and
   the at least one processor is configured to disengage the automatic parking function based on the duration of the brake operation input exceeding the threshold duration of time.

3. The parking assistance apparatus of claim 1, wherein:
the brake operation input satisfying the first condition comprises a duration of the brake operation input being less than or equal to a threshold duration of time, and
the at least one processor is configured to resume the automatic parking function based on the duration of the brake operation input being less than or equal to the threshold duration of time.

4. The parking assistance apparatus of claim 1, wherein:
the detected operation input of the user is a brake operation input indicated in the brake operation input information received through the interface,
the brake operation input satisfying the first condition comprises a brake operation value indicated in the brake operation input information being less than or equal to a threshold value, and
the at least one processor is configured to maintain performing the automatic parking function based on the brake operation value being less than or equal to the threshold value.

5. The parking assistance apparatus of claim 4, wherein:
based on the brake operation input satisfying the first condition, performing the automatic parking function according to the second control manner that accounts for the brake operation input of the user comprises:
based on the vehicle travelling at a lower speed according to the brake operation input, adjusting an automatic steering control value of the automatic parking function that controls the vehicle to follow the first parking path at the lower speed; and
controlling the vehicle to follow the first parking path at the lower speed according to the adjusted automatic steering control value.

6. The parking assistance apparatus of claim 4, wherein:
based on the brake operation input satisfying the first condition, performing the automatic parking function according to the second control manner that accounts for the brake operation input of the user comprises:
based on a parking speed of the automatic parking function being set by a user in a state in which the vehicle travels at a lower speed according to the brake operation input, performing the automatic parking function with the lower speed being set as the parking speed of the automatic parking function.

7. The parking assistance apparatus of claim 4, wherein:
based on the brake operation input satisfying the first condition, performing the automatic parking function according to the second control manner that accounts for the brake operation input of the user comprises:
based on the vehicle stopping according to the brake operation input, pausing the automatic parking function.

8. The parking assistance apparatus of claim 1, wherein:
the detected operation input of the user is an accelerator operation input indicated in the accelerator operation input information received through the interface,
the accelerator operation input satisfying the second condition comprises an accelerator operation value exceeding a threshold value, and
the at least one processor is configured to disengage the automatic parking function based on the accelerator operation value exceeding the threshold value.

9. The parking assistance apparatus of claim 1, wherein:
the detected operation input of the user is an accelerator operation input indicated in the accelerator operation input information received through the interface,
the accelerator operation input satisfying the first condition comprises an accelerator operation value being less than or equal to a threshold value, and
the at least one processor is configured to maintain performing the automatic parking function based on the accelerator operation value being less than or equal to the threshold value.

10. The parking assistance apparatus of claim 9, wherein:
based on the accelerator operation input satisfying the first condition, performing the automatic parking function according to the second control manner that accounts for the accelerator operation input of the user comprises:
based on the vehicle travelling at a higher speed according to the accelerator operation input, adjusting an automatic steering control value of the automatic parking function that controls the vehicle to follow the first parking path at the higher speed; and
controlling the vehicle to follow the first parking path at the higher speed according to the adjusted automatic steering control value.

11. The parking assistance apparatus of claim 9, wherein:
based on the accelerator operation input satisfying the first condition, performing the automatic parking function according to the second control manner that accounts for the accelerator operation input of the user comprises:
based on a parking speed of the automatic parking function being set by a user in a state in which the vehicle travels at a higher speed according to the accelerator operation input, performing the automatic parking function with the higher speed being set as the parking speed of the automatic parking function.

12. The parking assistance apparatus of claim 9, wherein:
based on the accelerator operation input satisfying the first condition, performing the automatic parking function according to the second control manner that accounts for the accelerator operation input of the user comprises:
based on the vehicle deviating from the first parking path, determining a second parking path, different from the first parking path, that directs the vehicle to the first target parking space; and
performing the automatic parking function by controlling the vehicle to follow the second parking path.

13. The parking assistance apparatus of claim 1, wherein:
the detected operation input of the user is a steering operation input indicated in the steering operation input information received through the interface,
the steering operation input satisfying the second condition comprises a steering operation value exceeding a threshold value, and
the at least one processor is configured to disengage the automatic parking function based on the steering operation value exceeding the threshold value.

14. The parking assistance apparatus of claim 13, wherein the at least one processor is further configured to:
in a state in which the automatic parking function is disengaged, and based on a user input for resuming the automatic parking function:
determine a second parking path that directs the vehicle to the first target parking space from a current position of the vehicle; and
perform the automatic parking function by controlling the vehicle to follow the second parking path.

15. The parking assistance apparatus of claim 1, wherein:
the detected operation input of the user is a steering operation input indicated in the steering operation input information received through the interface,
the steering operation input satisfying the first condition comprises a steering operation value being less than or equal to a threshold value, and
the at least one processor is configured to maintain performing the automatic parking function based on the steering operation value being less than or equal to the threshold value.

16. The parking assistance apparatus of claim 15, wherein:
based on the steering operation input satisfying the first condition, performing the automatic parking function according to the second control manner that accounts for the steering operation input of the user comprises:
stopping the vehicle; and
determining a second parking path that directs the vehicle to the first target parking space from a stopped location of the vehicle, according to the steering operation value of the steering operation input.

17. The parking assistance apparatus of claim 15, wherein:
based on the steering operation input satisfying the first condition, performing the automatic parking function according to the second control manner that accounts for the steering operation input of the user comprises:
controlling the vehicle to travel at a parking speed of the automatic parking function; and
determining a second parking path that directs the vehicle to the first target parking space from a travelling location of the vehicle, according to the steering operation value of the steering operation input.

18. The parking assistance apparatus of claim 1, wherein:
the detected operation input of the user is a steering operation input indicated in the steering operation input information received through the interface, and
the at least one processor is configured to:
based on the steering operation input satisfying a third condition:
determine a second target parking space based on the information about the vehicle surroundings sensed by the at least one sensor; and
determine a second parking path that directs the vehicle to the second target parking space.

19. A vehicle, comprising:
at least one sensor configured to sense vehicle surroundings;
a vehicle driving device comprising:
a brake driving device that operates according to a brake operation input information from a user;
a power source driving device that operates according to an accelerator operation input; and
a steering driving device that operates according to a steering operation input;
a display configured to display a graphic image for an automatic parking function; and
at least one processor configured to:
determine a target parking space based on information about the vehicle surroundings sensed by the at least one sensor;
determine a parking path that directs the vehicle to the target parking space; and
perform the automatic parking function by controlling the vehicle according to a first control manner to follow the parking path,
wherein the at least one processor is configured to, based on detecting an operation input from a user among the brake operation input, the accelerator operation input, or the steering operation input,
perform the automatic parking function according to a second control manner, different from the first control manner, that accounts for the operation input of the user,
wherein the detected operation input of the user is a brake operation input indicated in the brake operation input information, and
wherein the at least one processor is configured to, based on a brake operation value indicated in the brake operation input information exceeding a threshold value, pause the automatic parking function.

* * * * *